United States Patent [19]

Dubuc

[11] 4,330,844

[45] May 18, 1982

[54] LOGIC TIMING SYSTEM FOR TAPE DEVICE ADAPTER

[75] Inventor: Joseph J. Dubuc, Yukon, Okla.

[73] Assignee: Honeywell Information Systems Inc., Waltham, Mass.

[21] Appl. No.: 102,711

[22] Filed: Dec. 12, 1979

[51] Int. Cl.³ .......................... G06F 3/00; G06F 1/04
[52] U.S. Cl. ...................................................... 364/900
[58] Field of Search ... 364/200 MS File, 900 MS File; 307/208, 269; 328/72

[56] References Cited

U.S. PATENT DOCUMENTS

| | | | |
|---|---|---|---|
| 3,676,858 | 7/1972 | Finch et al. | 364/200 |
| 3,970,997 | 7/1976 | Daly et al. | 364/200 |
| 3,999,163 | 12/1976 | Levy et al. | 364/200 |
| 4,041,473 | 8/1977 | Bardotti et al. | 364/200 |
| 4,047,246 | 9/1977 | Kerllenevich et al. | 364/200 |
| 4,095,267 | 6/1978 | Morimoto | 364/200 |
| 4,110,830 | 8/1978 | Krygowski | 364/200 |
| 4,112,490 | 9/1978 | Pohlman et al. | 364/200 |

Primary Examiner—Gareth D. Shaw
Assistant Examiner—Eddie P. Chan
Attorney, Agent, or Firm—Nicholas Prasinos

[57] ABSTRACT

A hardware logic timing system for a tape device adapter is disclosed for accommodating the exchange of control information and data between a medium performance device controller (MPDC) and mass storage devices. Plural timing frequencies exhibiting selectively variable phase relationships are provided for increased operating mode flexibility. More particularly, 1×1, 4×3, 8×5, 8×7 or 8×9 data packing or depacking operations with or without code conversion are supported during both data reads and data writes.

The logic timing system is responsive to the MPDC and each of the mass storage devices, and may operate in clear, wait, normal or burst modes to preserve information integrity while maintaining commercially acceptable transfer rates.

5 Claims, 13 Drawing Figures

LOGIC TIMING SYSTEM FOR TAPE DEVICE ADAPTER

BACKGROUND OF THE INVENTION

1. Field of the Invention

The invention relates to timing control systems for routing data between magnetic tape storage devices and main memory in a data processing system, and more particularly to a logic timing system for accommodating a data transfer between magnetic tape storage devices and data processing units having different data formats, densities, data processor code conventions, logic level conventions and transfer rates.

2. Prior Art

In a data processing system wherein a plurality of functional units are electrically coupled by a common communication bus, medium performance device controllers (MPDC) have been employed to accommodate data transfers between mass storage devices and the main memory of the data processing system. In order to relieve the CPU of an unnecessary overhead burden, the MPDC has included a Read Only Store (ROS) memory having microprogram instructions stored therein to provide a near autonomous operation. The MPDC thus is a microprogrammed peripheral control subsystem for storing and retrieving data from main memory, and communicating with mass storage adapters which have the facility to support one or more mass storage devices such as magnetic tapes or disks.

In contemporary data processing centers, it is not uncommon for a single user to require access to more than one data processing system. Where the data processing systems are provided by different vendors, a difference in the data densities, the number of tape tracks, the data packing formats, the data transfer rates and the processing codes may be encountered. For example, one system may use seven-track tapes having 500 bytes per inch, another system may use nine-track tapes having 6250 bytes per inch. One processor may have six-bit bytes, and another have eight-bit bytes, thereby requiring a packing or depacking of data. Data stored in an IBM memory may be in the IBM EBCDIC code, while that stored in a Burroughs memory may be in a different Burroughs EBCDIC code. Thus, when data is transferred between the two systems, a code conversion is required.

To provide maximum flexibility, the device controller must remain primarily identified with a single data processing system. A single system design thereby may be solidified for marketing. When further flexibility is required, that flexibility is implemented at the tape device adapter level to avoid undue impact on the manufacture of the main system product. This approach is thwarted, however, if the adapter becomes too complex too interface efficiently with the existing controller logic. Packaging constraints thus also enter into play.

In order to provide a commercially acceptable flexibility in operation modes, the logic timing system of the tape device adapter is required to provide plural timing signals, and to accommodate the selection of alternative phase relationships with minimal hardware changes. The logic timing system further is required to operate in clear, wait, normal and burst modes to compensate for delays in data transfers, and to avoid loss of information and residual data errors.

The present invention provides a unique logic timing system having the above-described requirements for accommodating in a tape device adapter $1 \times 1$, $4 \times 3$, $8 \times 5$, $8 \times 7$ and $8 \times 9$ data packing and depacking operations during both data read and data write transfers between devices having different data transfer rates, data formats, densities and code conventions.

SUMMARY OF THE INVENTION

The present invention is directed to a logic timing system for a tape device adapter accommodating the transfer of information between plural mass storage devices and a medium performance device controller (MPDC) in a data processing system, wherein the mass storage devices and the MPDC each may exhibit different processor codes, densities, data formats, recording medium tracks, logic conventions and data transfer rates.

More particularly, the logic timing system provides plural timing signals having dynamically selectable phase relationships for accommodating the selection of any of a plurality of pack-depack modes with or without code conversion during either a data read or a data write. The logic timing system further compensates for information transfer delays by entering into a burst mode in response to either MPDC or mass storage device data requests, thereby maintaining a commercially acceptable transfer rate.

In one aspect of the invention, a secondary clock source derived from a primary clock source is provided by means of a unique arrangement of logic devices to alternate the application of the primary and secondary clock sources between parallel-in-serial-out (PISO) and first-in-first-out (FIFO) registers. The logic timing system thereby provides a substantially increased mode selection flexibility with minimal changes in the logic system. For example, $1 \times 1$ and $4 \times 3$ pack-depack data operations during data reads and writes with or without code conversion may be accommodated with no changes to the logic system.

Further, $8 \times 5$ and $8 \times 7$ pack-depack data operations may be accommodated by merely switching outputs on a serial-in-parallel-out (SIPO) register. Still further, an $8 \times 9$ pack-depack data operation may be provided by switching the outputs of the SIPO register and adding four logic gates and an inverter to the logic timing system.

In another aspect of the invention, the logic timing system includes logic circuitry responsive to the MPDC and each of plural mass storage devices for selectively entering into a clear, wait, normal or burst mode to synchronize the transfer of information through the tape device adapter to maintain commercially acceptable data transfer rates without incurring data losses or residual data errors.

DESCRIPTION OF THE DRAWINGS

For a more complete understanding of the present invention, and for further objects and advantages thereof, reference may now be had to the following description taken in conjunction with the accompanying drawings in which.

DESCRIPTION OF THE PREFERRED EMBODIMENT

FIG. 1

Figure 1:
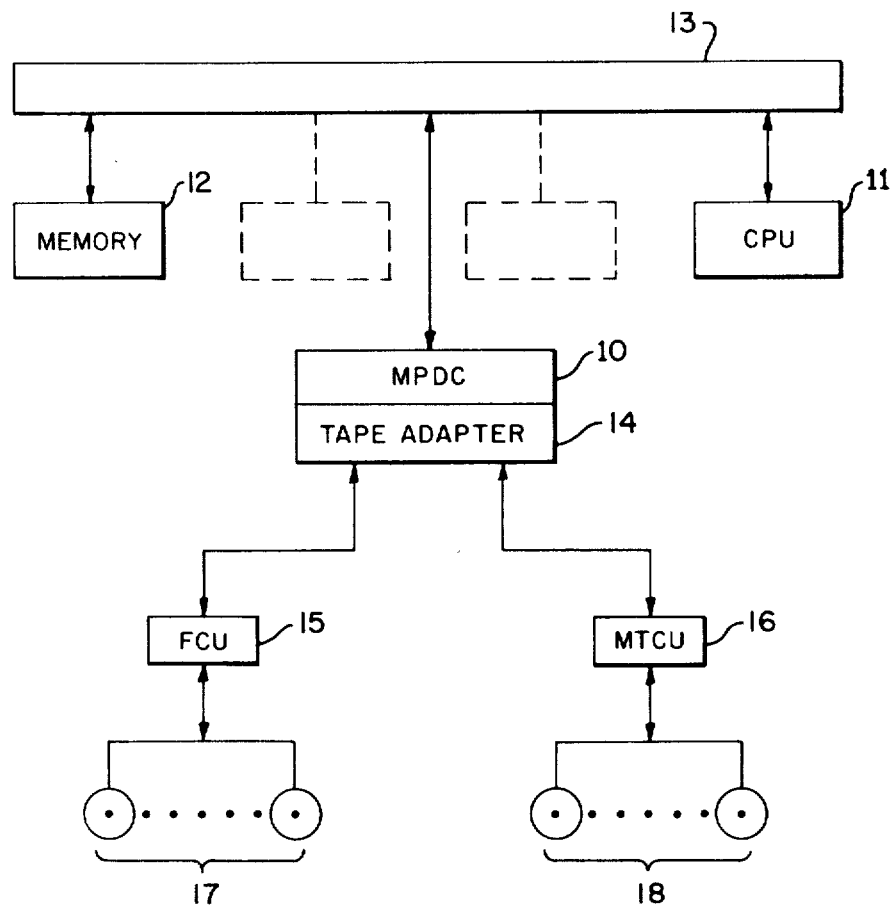
FIG. 1 is a functional block diagram of a data processing environment wherein the invention may be used.

FIG. 1 illustrates in functional block diagram form a computer system having a medium-performance device controller (MPDC) 10, which is in electrical communication with a central processor unit 11 and a main memory unit 12 by way of a common communication bus hereinafter referred to as the MEGABUS system 13. The MPDC 10 is a microprogrammed peripheral control system for storing and retrieving data from mass storage media. The MPDC communicates with mass storage adapters such as a tape device adapter 14, which in turn communicates with a format control unit (FCU) 15 and a magnetic tape control unit (MTCU) 16. Units 15 and 16 support plural daisy-chained tape devices 17 and 18, respectively.

The FCU 15 is a read/write device which receives encoded information from the tape device adapter 14 for controlling the motion of a tape device, and performs status and error checking during the transfer of data to and from a tape device. The MTCU 16 by way of contrast is a read only device.

The MEGABUS system 13 provides an information path between any two units in the system. The paths are asynchronous in design, thereby enabling units of various speeds to operate efficiently. The bus accommodates information transfers including communication requests, control commands, status signals and data transfers between main memory unit 12 and tape devices 17, 18.

Any system unit requiring communication with any other system unit issues a bus cycle request. When the bus cycle is granted, the requesting unit becomes the master and the addressed system unit becomes the slave. If a bus interchange requires a response cycle as well as a request cycle, the master unit may identify itself to a slave unit and indicate that a response is required. When the required information becomes available, the slave assumes the role of master and initiates a transfer to the requesting unit.

In the servicing of bus cycle requests, the central processor has the lowest priority, the MPDC 10 has the next to the lowest priority, and the memory unit 12 has the highest priority.

A more detailed background description of the MEGABUS system 13 of FIG. 1 is given in U.S. Pat. No. 3,993,981 which is assigned to the assignee of the present invention, and which is incorporated by reference herein.

A user-oriented software package resides in memory unit 12 and is accessed by the CPU 11. If a tape device command is requested, the CPU transfers command information by way of the MEGABUS system 13 to the MPDC 10. The tape device adapter 14 thereafter receives encoded information from the MPDC 10 to accommodate a data read, a data write, a read with code conversion, a read with pack-depack, a read with pack-depack and code conversion, a write with code conversion, a write with pack-depack, or a write with pack-depack and code conversion. The tape adapter selects either the FCU 15 or the MTCU 16 in response to the MPDC code, and issues tape motion commands to effect the requested operation.

If a read data command is issued, analog information may be transferred from a tape device to either the FCU or to the MTCU. The selected one of units 15 and 16 converts the analog information into digital information, which is routed through the tape device adapter 14 to the MPDC 10. The MPDC thereafter requests a bus cycle from the MEGABUS system 13, and upon being assigned a bus cycle transfers the data to memory unit 12 by way of the MEGABUS system 13.

If a write data command is issued by the CPU 11, the MPDC 10 requests a read cycle from the MEGABUS system 13. The write information is transferred from memory unit 12 to the MPDC 10, and thence through the tape device adapter 14 to the FCU 15. The FCU receives encoded control information from the tape device adapter 14 to command a read forward, read reverse, or rewind for tape motion control. The FCU further performs status and error checks on data to and from the tape devices.

FIG. 2

Figure 2:
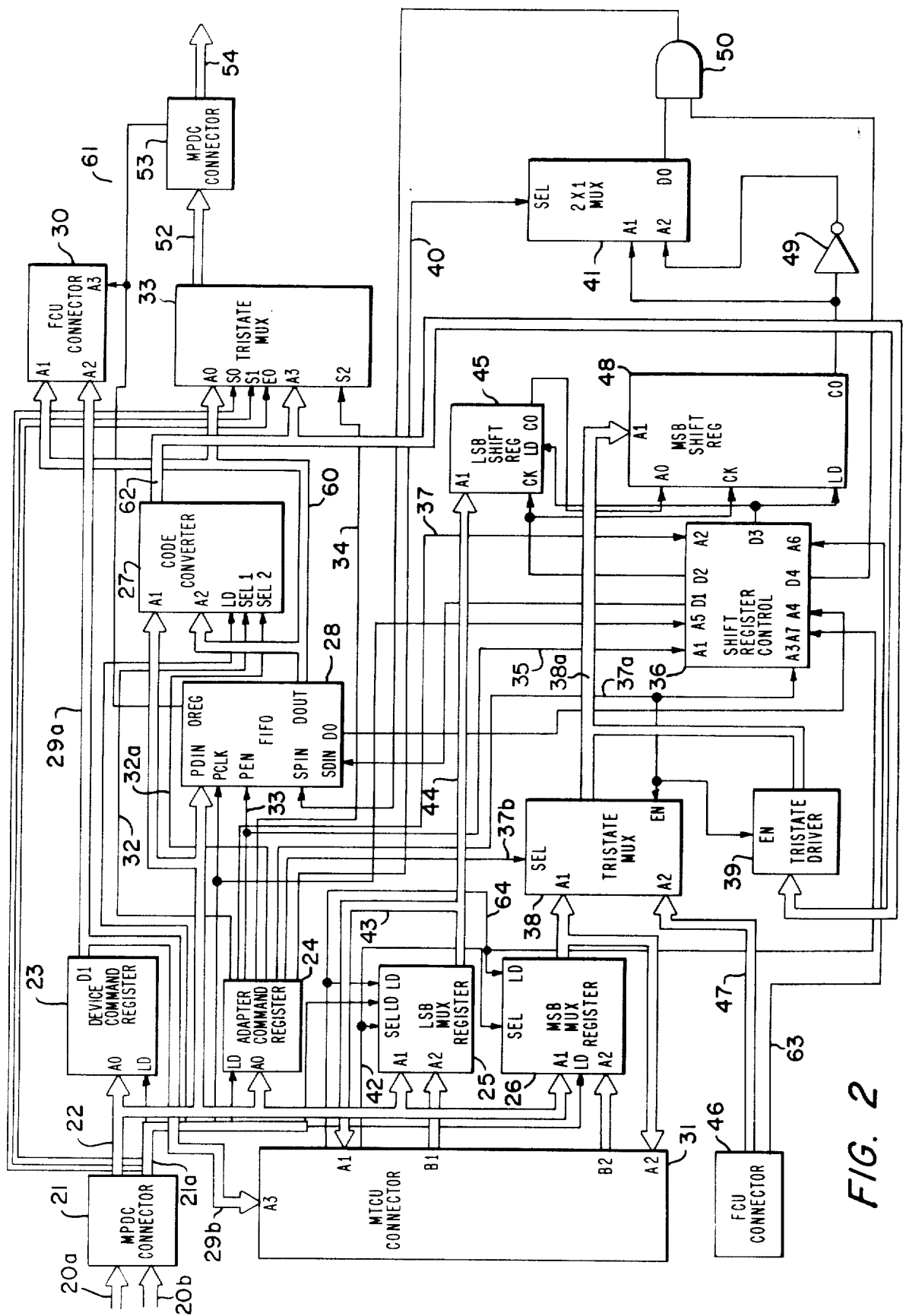
FIG. 2 is a functional block diagram of a tape device adapter embodying the invention.

FIG. 2 illustrates in a detailed functional block diagram form the tape device adapter 14 of FIG. 1.

Data is received from the MPDC 10 by way of an eight-bit data cable 20a leading to an MPDC connector 21. An eight-bit output of the connector is applied by way of an eight-bit data cable 22 to an eight-bit device command register 23, to an eight-bit adapter command register 24, to the A1 input of a two-to-one multiplexer register 25 and to the A1 input of a two-to-one multiplexer register 26. Data cable 22 further is connected to the A1 input of a code converter 27 and to the parallel data input (PDIN) of an eight-by-sixteen bit FIFO (first-in-first-out) shift register 28. Control information is received from the MPDC 10 by way of an eight-bit control cable 20b leading to the connector 21. An eight-bit output of the connector 21 is applied to a control cable 21a supplying load commands to command registers 23 and 24, and to multiplexer registers 25 and 26.

An eight-bit output D1 of command register 23 is applied by way of a data cable 29a to the A2 input of an FCU connector 30 in electrical communication with the FCU 15 of FIG. 1. The eight-bit output of command register 23 further is applied by way of a data cable 29b to the A3 input of an MTCU connector 31 in electrical communication with MTCU 16 of FIG.1.

The adapter command register 24 supplies commands to the logic system of FIG. 2 to control the flow of data. More particularly, two outputs of command register 24 are supplied by way of control lines 32 and 32a respectively to the SEL1 and SEL2 select inputs of the code converter 27. A third output of the command register is applied by way of a control line 34 to the S2 input of a tri-state multiplexer 33. A fourth output of command register 24 is applied by way of a control line 33 to the parallel enable (PEN) input of FIFO 28, and by way of a control line 35 to the A1 input of a shift register control unit 36. A fifth output of the command register 24 is applied by way of a control line 40 to the SEL select input of a 2×1 multiplexer 41. A sixth output of the command register 24 is applied by way of a control line 37 to the A2 input of the shift register control unit 36. A seventh output of the command register 24 is applied to a control line 37a leading to the A3 input of the shift register control unit 36, to the enable input (EN) of a tri-state multiplexer 38, and to the enable input (EN) of a tri-state driver 39. An eighth output of command register 24 is applied by way of a control line 37b leading to the SEL select input of tri-state multiplexer 38.

The SEL select input to multiplexer register 25 is supplied from the MTCU connector 31 on a control line 42, which is further connected to the SEL select input of multiplexer register 26. The A2 input to multiplexer register 25 is connected to the eight-bit B1 output of the MTCU connector 31. The output of the multiplexer register 25 is applied by way of an eight-bit data cable 43 to the A1 input of MTCU connector 31, and by way of an eight-bit data cable 44 to the A1 input of an eight-bit shift register 45.

The A2 input to multiplexer register 26 is connected to the eight bit output B2 of the MTCU connector 31, and the eight bit output of the multiplexer register is connected to the A1 input of multiplexer 38 and to the A2 input of connector 31.

An FCU connector 46 in electrical communication with the FCU 15 of FIG. 1 supplies data to the A2 input of multiplexer 38 by way of an eight-bit data cable 47. The eight-bit output of multiplexer 38 is connected to the eight-bit output of driver 39, and applied by way of an eight-bit data cable 38a to the A1 data input of a most significant byte (MSB) shift register 48.

The A0 input of shift register 48 is connected to the carry-out (CO) output of a least significant byte (LSB) shift register 45, and the clock input of the shift register 48 is connected to the clock input of shift register 45 and to the D2 output of shift register control unit 36. The load input to shift register 48 is connected to the load input of shift register 45, and to the D3 output of shift register control unit 36. The CO output of shift register 48 is applied to the A1 input of multiplexer 41, and through an inverter 49 to the A2 input of multiplexer 41.

The A4 input of shift register control unit 36 receives an input-full signal from the D0 output of FIFO 28, and the D1 output of the control unit 36 supplies an 8.0 MHz clock signal to the serial data input (SDIN) of the FIFO. The D2 output of the control unit 36 is connected to the clock input of the shift register 45, and to the clock input of the shift register 48. The D4 output of the control unit is connected to one input of an AND gate 50. A second input to gate 50 is connected to the D0 output of multiplexer 41, and the output of gate 50 is connected to the SPIN input of FIFO 28.

The eight-bit data output DOUT of FIFO 28 is applied to the A2 input of code converter 27, to the A0 input of multiplexer 33 and to the A1 input of FCU connector 30. The A3 input of multiplexer 33 is connected to the output of code converter 27, and to the input of driver 39. The output of multiplexer 33 is applied by way of an eight-bit data cable 52 through an MPDC connector 53, and to an eight-bit data cable 54 leading to the MPDC 10 of FIG. 1.

In any data read or write operation, data and control information are received by the MPDC 10 by way of the MEGABUS system 13 under the control of CPU 11. The MPDC 10 decodes the control information from CPU 11, and encodes therefrom tape device commands such as rewind, rewind and unload, read forward, write forward, forward space block, backspace block, forward space to tape mark, backspace to tape mark, and tape density. The encoded commands thereafter are applied to the data cable 20a and through the connector 21 to data cable 22. The MPDC 10 further generates load command strobes on the control cable 20b which are applied through the MPDC connector 21 and along control cable 21a to the load (LD) input of device command register 23. The tape device commands thereby are loaded into the device command register 23.

The MPDC 10 also decodes the control information from CPU 11, and encodes therefrom adapter commands such as device type, pack-depack algorithm, read or write, and code conversion selection. The MPDC 10 applies such encoded commands on data cable 20a as described above, and generates load command strobes on control bus 21a to load the adapter commands into the adapter command register 24.

If a one-by-one data write to the FCU 15 is requested by the CPU 11, the device command register 23 is loaded with an encoded eight-bit byte for a write forward command to the FCU 15. The D1 output of device command register 23 is applied by way of the cable 29a and FCU connector 30 to the FCU 15.

The adapter command register 24 outputs on lines 33 and 35 enable the parallel (PEN) input of FIFO 28, and disable the shift register control unit 36. When the MPDC 10 applies data to the data cable 22 and generates a load command strobe on control bus 21a, the data is loaded through the PEN input into FIFO 28. Upon the data being shifted to the D0 output of the FIFO 28, the data also is placed on data cable 60 leading to the A1 input of the FCU connector 30. If the data is valid, the FIFO 28 generates a data valid signal at the OREG output which is applied by way of control line 61 to the A3 input of connector 30. The FCU 15 thereby is signalled that the data at the FCU connector 30 may be written onto tape devices 17 of FIG. 1.

If a 1×1 data write with code conversion is requested by the CPU 11, the FCU 15 is controlled by the device command register 23 as before described. The adapter command register 24 is loaded with the necessary adapter commands to route the data on the data cable 20a from connector 21 to the A1 input of the code converter 27. The encoded output of code converter 27 is applied to data cable 62, and through the tri-state driver 39 to the A1 input of shift register 48. When the MPDC 10 generates a strobe on control cable 20b, the A1 input to shift register control unit 36 is enabled and the PEN input to FIFO 28 is disabled. The D3 output of the shift register control unit 36 in response thereto transitions to a logic one level to effect the loading of the encoded data into the shift register 48. The shift register control unit 36 further generates eight shift pulses at the D2 output of the control unit to shift the data through the shift register 48 to the multiplexer 41. In addition, the D4 output of the shift register control unit 36 transitions to a logic one level to gate the output of multiplexer 41 through gate 50 to the SPIN input of FIFO 28.

The serial data flow into FIFO 28 is synchronized with the shift clock pulses issued by the control unit 36 to the shift register 48. More particularly, each time the control unit issues a clock pulse to the FIFO 28, a clock pulse is issued to shift register 48. This sequence is repeated eight times, after which the FIFO generates an input full signal to the control unit 36 to terminate the shift register and FIFO clock pulses. The parallel output of FIFO 28 thereafter is applied through the A1 input of connector 30 to the FCU 15.

If the device and adapter command registers are loaded for a 4×3 write sequence, the device command register 23 supplies the necessary commands for a write sequence through the A2 input of connector 30 to the FCU 15. The MPDC 10 routes the data on data cable 22 through the multiplexer register 26 and the tri-state multiplexer 38 to the A1 input of shift register 48. The MPDC 10 issues a load pulse on control cable 21a to parallel load the data into the shift register 48 as previously described with the 1×1 write with code conversion, and to excite the shift register control unit 36. In response thereto, the control unit 36 issues clock signals to shift the data out of register 48 to multiplexer 41. Under the control of the command register 24 and the control unit 36, the data is selected to the output of multiplexer 41 and routed through gate 50 to the SPIN input of FIFO 28 in a manner to effect a data packing. More particularly, the control unit 36 does not clock the FIFO 28 until after two shift commands are issued to the shift register 48. The D4 output of the control unit 36 thereafter transitions to a logic one level, and the before-described sequence wherein the shift register 48 is shifted after the FIFO 28 is clocked is repeated six times. The parallel output of FIFO 28 thereby supplies eight bit bytes wherein the information in two most significant bit cells has been suppressed.

A 4×3 write sequence is seen to be that operation of the logic system of FIG. 2 wherein three data bytes are written into a tape device for each four data bytes received at connector 21. More particularly, for every four data bytes that are transferred into the tape adapter 14 by way of connector 21, there are only three data bytes formulated at the output of the FIFO 28. That is, the high order two bits of each data byte are deleted.

In the event that a 4×3 write with code conversion is requested, the command information flow is as before described. Data is received by way of connector 21, and presented to the code converter 27. The output of converter 27 is routed through tri-state driver 39 and parallel loaded into shift register 48. The data processing thereafter proceeds in the same manner as described for the 4×3 write without code conversion.

If the adapter command register 24 is loaded to control a 1×1 read from the FCU 15, the device command register 23 is loaded for a read forward command. Data is received from the FCU connector 46, and routed through tri-state multiplexer 38 under the control of the adapter command register 24. In response to a data valid signal appearing on control line 63, the shift register control unit 36 effects the parallel loading of the data into shift register 48, and the serial shifting of such data through the shift register and multiplexer 41 to gate 50. Under the control of the shift register control unit 36, the serial data stream is gated through AND gate 50 to the SPIN input of FIFO 28. In addition, the parallel output of FIFO 28 is routed by command register 24 through the A0 input of tri-state multiplexer 33 to data cable 52 leading to the MPDC connector 53.

In the case of a 1×1 read with code conversion, the data input sequence to FIFO 28 is the same as that for a 1×1 read without code conversion. The data output of FIFO 28, however, is routed through the code converter 27 to the A3 input of the tri-state multiplexer 33. The adapter command register 24 selects the multiplexer to the A3 input, thereby directing the data flow to MPDC connector 53.

In a 4×3 read sequence, the data input to shift register 48 is the same as that for a 1×1 read with or without code conversion. The shifting of the data out of register 48 into FIFO 28, however, differs in that the two high order bits of each data byte are zeroed in FIFO 28. More particularly, the shift register control unit 36 delays the clock signal to shift register 48 until after two shift commands have been issued to FIFO 28. For every three bytes of data received from FCU 15, four bytes of data are supplied to the MPDC 10. The shift register 48 and FIFO 28 thereafter are shifted in sync through six bit positions to form a data byte having two high order logic zero bits. The data output of FIFO 28 then is presented in parallel to the A0 input of the tri-state multiplexer 33.

If a 4×3 read with code conversion is requested, the 4×3 read sequence is repeated as before described with one exception. The adapter command register 24 selects multiplexer 33 to its A3 input. The data output of FIFO 28 thereby is passed through code converter 27 and the A3 input of multiplexer 33 to the MPDC connector 53.

The above-described read operations may also be conducted with the MTCU 16. In an MTCU read operation, the device command register 23 is loaded with tape motion commands for the MTCU 16. The command information is transferred as an eight-bit encoded word from the command register 23 to the MTCU connector 31 by way of cable 29b. Further, an MTCU configuration word is loaded from the MPCD 10 into the multiplexer registers 25 and 26 to select data densities and specific tape devices. In addition, the adapter command register 24 is loaded with command information to control the data flow path through the tape adapter 14 logic system of FIG. 2.

When the MTCU 16 has data available for transfer to tape adapter 14, the MTCU raises line 42 to a logic one level to select the A2 inputs of multiplexer registers 25 and 26. The MTCU 16 also generates a data valid signal on control line 64 which is applied to the load inputs of registers 25 and 26, and to the A7 input to shift register control unit 36. The register 25 thereby routes data received from the B1 output of connector 31 to the A1 input of shift register 45. Data appearing at the B2 output of the connector is applied through register 26 and the A1 input of multiplexer 38 to the A1 input of shift register 48. The eight least significant bits (LSB) of a 16-bit MTCU data word thus are stored in shift register 45, and the eight most significant bits (MSB) are stored in shift register 48.

If a 1×1 read sequence is requested, the data output of the MSB shift register 48 is presented to the multiplexer 41 by way of inverter 49. The purpose of the inverter 49 is to convert from the logic one data system of the FCU 15 to the logic zero data system of the MTCU 16.

The data appearing at the output of multiplexer 41 is applied through gate 50 to the SDIN input of FIFO 28. The shift register control unit 36 provides a clock pulse to FIFO 28, followed by a clock pulse to each of shift registers 45 and 48. After sixteen such clock pulse sequences have been generated, the sixteen bits of data from the MTCU connector 31 are formed into two eight-bit bytes in FIFO 28. If no code conversion is requested, the data appearing at the output of FIFO 28 is applied through the A0 input of tri-state multiplexer 33 to connector 53. If a code conversion is requested, the data appearing at the output of FIFO 28 is routed through code converter 27 and the A3 input of multiplexer 33 to the connector 53.

In a 4×3 read operation, the data path to the shift registers 45 and 48 is the same as with a 1×1 read operation. Further, the data from the MTCU 16 is shifted out of shift registers 45 and 48, and shifted into FIFO 28 in the same manner as before described in an FCU 4×3 read operation. Since the MTCU supplies data words and not data bytes, there is only one-half the number of load pulses to LSB and MSB shift registers 45 and 48. If the read operation is to include code conversion, the data appearing at the output of FIFO 28 is routed through converter 27 and the A2 input of multiplexer 33 to to connector 53. If no code conversion is required, the multiplexer 33 is selected to its A0 input.

The MTCU 16 further accommodates a data wrap-around with the MPDC 10. More particularly, the adapter command register 24 is loaded for a write sequence, and the device command register 23 is loaded for a diagnostic write operation. The MPDC 10 thereafter loads the LSB multiplexer register 25 with the low order eight bits of a diagnostic word to be written, and the MSB multiplexer register 26 with the high order eight bits of the diagnostic word. The information appearing at the outputs of multiplexers 25 and 26 are applied to the A1 and A2 inputs respectively of the MTCU connector 31.

After the expiration of a time delay, the MTCU 16 returns the diagnostic data through the B1 and B2 outputs of connector 31 to the A2 inputs of registers 25 and 26, respectively. The MTCU further selects the registers 25 and 26 to their A2 inputs, and the MPDC 10 loads the diagnostic data from the MTCU into the registers. Under the control of the adapter command register 24, the output of register 25 is applied to the A1 input of shift register 45. In addition, the output of register 26 is applied through the A1 input of multiplexer 38 to the A1 input of shift register 48. The data flow thereafter proceeds in the manner before described for a 1×1 read operation with the MTCU 16.

FIGS. 3a–3d

FIGS. 3a–3d disclose in a more detailed block diagram form the tape adapter 14 of FIG. 1.

In referring to the electrical schematics of FIGS. 3a–3d, it is to be understood that the occurrence of a small circle at the input of a logic device indicates that the input is enabled by a logic zero. Further a circle appearing at an output of a logic device indicates that when the logic conditions for that particular device are satisfied, the output will be a logic zero.

It further is to be understood that the logic interfaces with the FCU connectors 46 and 30 have been deleted in FIGS. 3a–3d to avoid undue obfuscation caused by a multiplicity of overlapping lines.

Figure 3A:
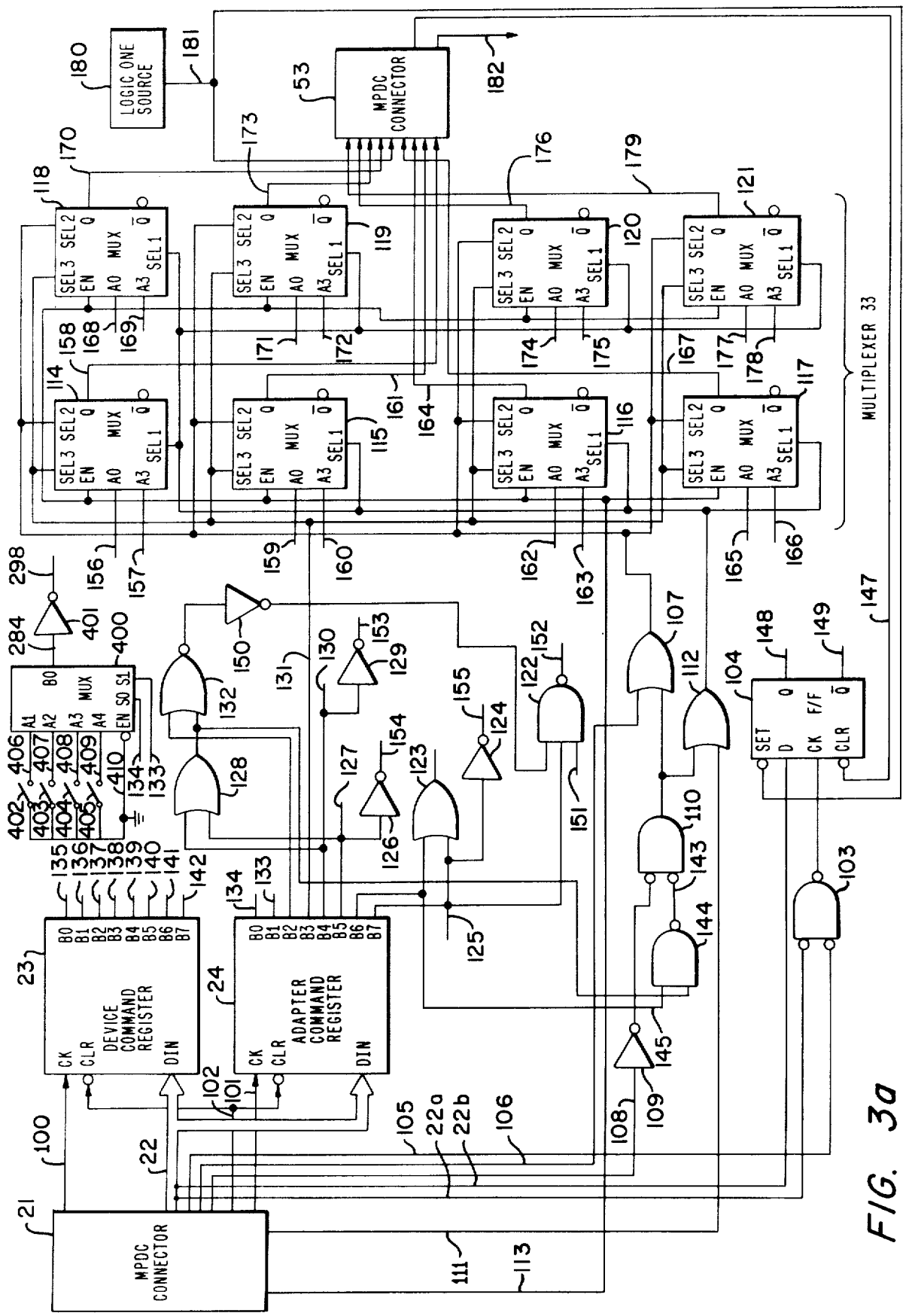
FIGS. 3a–3d are detailed electrical schematic drawings of the tape device adapter of FIG. 2.

Referring to FIG. 3a, the MPDC 10 of FIG. 1 supplies a binary information stream by way of connector 21 and cable 22 to the data inputs of device command register 23 and adapter command register 24. The data bit 7 line of cable 22 is electrically connected to a data line 22a leading to one input of an EXCLUSIVE OR gate 103. The data bit 6 line of cable 22 is electrically connected to a data line 22b leading to the D input of a flip-flop 104.

The MPDC in addition supplies clock signals to the register 23 and the register 24 by way of control lines 100 and 101, respectively. The MPDC further supplies a clear command to registers 23 and 24 by way of the connector 21 and a control line 102. The MPDC also supplies a control signal by way of a control line 105 to a second input of gate 103, a control signal by way of a control line 106 to one input of an OR gate 107, and a control signal by way of a control line 108 and an inverter 109 to one input of a NAND gate 110. The MPDC also supplies control signals to control a line 111 connected to one input of an OR gate 112, and to control line 113 leading to the enable inputs of eight-to-one tri-state multiplexers 114–121.

The bit 7 (B7) output of command register 24 is supplied to one input of a NAND gate 122, to one input of an OR gate 123, to the input of an inverter 124, and to a control line 125. The bit 6 (B6) output of register 24 is applied to a second input of OR gate 123. The bit 5 (B5) output of the register 24 is applied to the input of an inverter 126, to a control line 127 and to one input of an OR gate 128. The bit 4 (B4) output of register 24 is applied to the input of an inverter 129, to a control line 130 and to a second input of OR gate 128. The bit 3 (B3) output of register 24 is applied to a control line 131 leading to the select 3 (SEL 3) inputs of multiplexers 114–121. The bit (B2) output of register 24 is connected to one input of a NOR gate 132, and the bit 1 (B1) output of the register is connected to a control line 133. The bit zero (B0) output of register 24 is connected to a control line 134.

The B0 output of command register 23 is connected to a control line 135, the B1 output to a control line 136, the B2 output to a control line 137, and the B3 output to a control line 138. The B4 output of register 23 is applied to a control line 139, the B5 output to a control line 140, the B6 output to control line 141 and the B7 output to a control line 142. The control lines 135–142 are connected to the A2 input of FCU connector 30, and to the A3 input of MTCU connector 31 of FIG. 2.

A second input to NAND gate 110 is connected by way of a control line 143 to the output of a NAND gate 144. A first input to gate 144 is connected to a control line 145, and a second input to gate 144 is connected to the output of gate 128. The output of the gate 110 is applied to second inputs of OR gates 107 and 112. The output of gate 107 in turn is applied to the select 2 (SEL2) inputs of multiplexers 114–121. The output of OR gate 112 is connected to the select 1 (SEL1) inputs of multiplexers 114–121.

The set input of flip-flop 104 is connected to the output of logic one source 180 and the clock input to the flip-flop is connected to the output of gate 103. The clear input to the flip-flop is connected by way of a control line 147 and MPDC connector 53 to the MPDC 10 of FIG. 1. The Q output of flip-flop 104 is connected to a control line 148, and the $\overline{Q}$ output of the flip-flop is connected to a control line 149.

Referring to NOR gate 132 at the B2 output of command register 24, a second input to the NOR gate is connected to the output of OR gate 128. The output of gate 132 is applied through an inverter 150 to a second input of NAND gate 122. A third input to gate 122 is connected to a control line 151, and the output of gate 122 is connected to a control line 152. The output of inverter 129 is connected to a control line 153, and the output of inverter 126 is connected to a control line 154. The output of inverter 124 is connected to a control line 155 leading to the MPDC connector 53. The output of gate 123 is connected to a control line 123a also leading to connector 53.

The A0 input to multiplexer 114 is connected to a data line 156, and the A3 input to the multiplexer is connected to a data line 157. The Q output of multiplexer 114 is applied to a data line 158 leading to the MPDC CONNECTOR 53. The A0 input to multiplexer 115 is connected to a data line 159, and the A3 input to the multiplexer is connected to a data line 160. The Q output of the multiplexer is connected to a data line 161 leading to the MPDC connector 53.

The A0 input to multiplexer 116 is connected to a data line 162, and the A3 input to the multiplexer is connected to a data line 163. The Q output of the multiplexer 116 is applied to a data line 164 leading to the connector 53. The A0 input to multiplexer 117 is connected to a data line 165, and the A3 input to the multiplexer is connected to a data line 166. The Q output of multiplexer 116 is applied by way of a data line 167 to the MPDC connector 53.

The A0 input to multiplexer 118 is connected to a data line 168, and the A3 input to the multiplexer is connected to a data line 169. The Q output of the multiplexer 118 is applied by way of a data line 170 to the MPDC connector 53. The A0 input to multiplexer 119 is connected to a data line 171, and the A3 input to the multiplexer is connected to a data line 172. The Q output of the multiplexer 119 is applied by way of a data line 173 to the connector 53.

The A0 input to multiplexer 120 is connected to a data line 174 and the A3 input to the multiplexer is connected to a data line 175. The Q output of the multiplexer 120 is applied by way of a data line 176 to the connector 53. The A0 input of multiplexer 121 is connected to a data line 177, and the A3 input to the multiplexer is connected to a data line 178. The Q output of multiplexer 121 is applied by way of a data line 179 to the connector 53.

The output of a logic one source 180 is applied by way of a control line 181 through connector 53 to the MPDC 10. The MPDC 10 supplies a control signal to a control line 182 by way of connector 53.

Switches 402-405 are connected to ground, and to a control line 410 leading to the enable (EN) input of a four-to-one multiplexer 400. The A1-A4 inputs to the multiplexer are connected respectively to control lines 406-409. The S0 and S1 switch control inputs of the multiplexer are connected respectively to control lines 134 and 133. The B0 output of the multiplexer is applied through inverter 401 to control line 298.

Figure 3B:
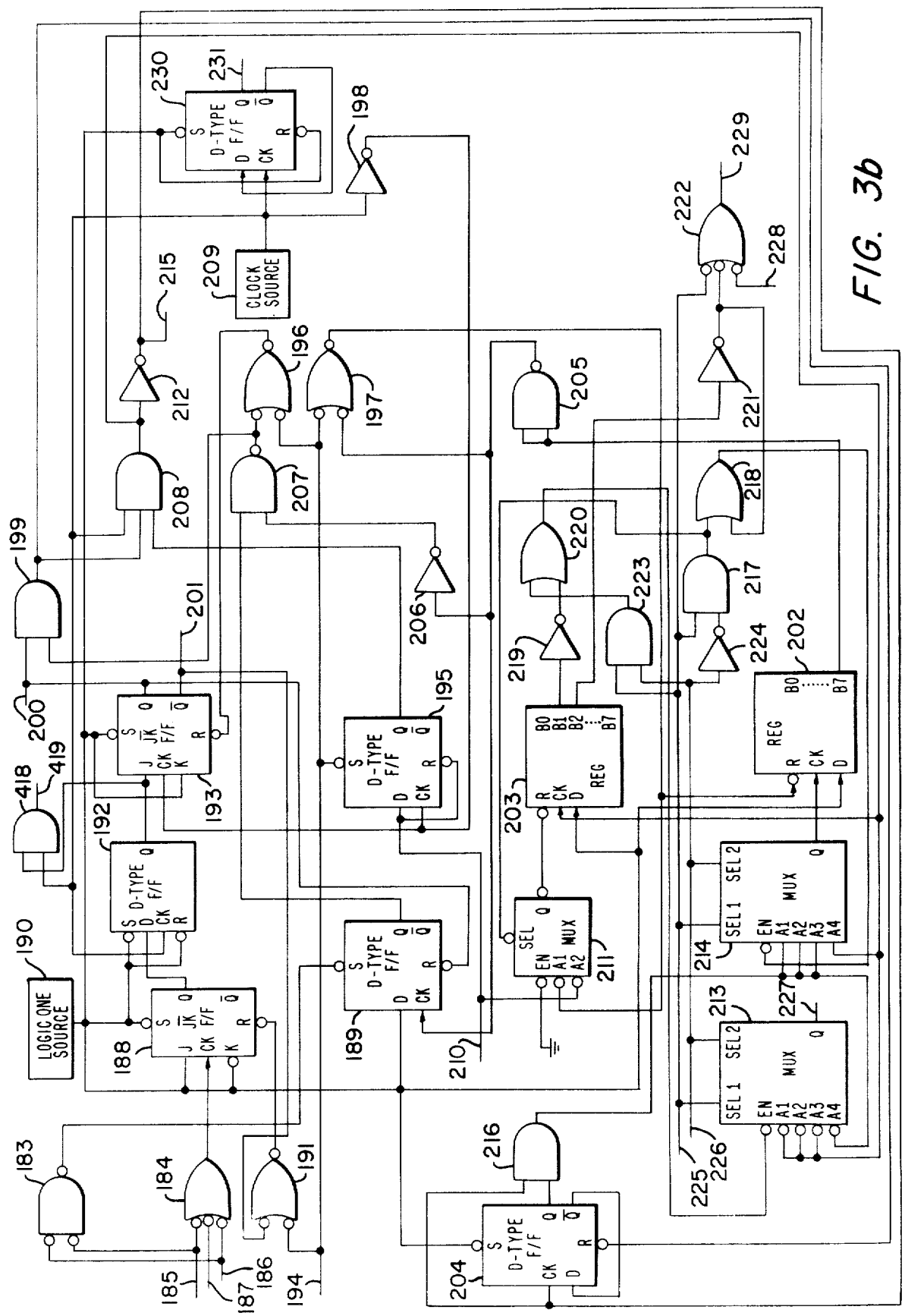

Referring to FIG. 3b, which illustrates the invention in logic diagram form, a first input to an EXCLUSIVE OR gate 183 is connected to a first input of a NOR gate 184 and to a control line 185. A second input to gate 183 is connected to a second input of gate 184 and to a control line 186 leading to control line 63 of FIG. 2. A third input to gate 184 is connected to a control line 187, and the output of gate 184 is applied to the clock input of a JK-NOT flip-flop 188. The output of gate 183 is applied to the set input of a D-type flip-flop 189.

The set, J and K inputs to flip-flop 188 each are connected to the output of a logic one source 190. The reset input to flip-flop 188 is connected to the output of an EXCLUSIVE OR gate 191, and the Q output of the flip-flop is connected to the D input of a D-type flip-flop 192.

A firt input to gate 191 is connected to the $\overline{Q}$ output of a JK-NOT flip-flop 193, and a second input to the gate 191 is connected to a control line 194 leading to the control line 182 of FIG. 3a. Line 194 also is connected to the set input of a D-type flip-flop 195, to one input of an EXCLUSIVE OR gate 196, and to one input of an EXCLUSIVE OR gate 197.

The set and K inputs to flip-flop 193 are connected to the output of the logic one source 190, and the J input is connected to the Q output of flip-flop 192. The reset input to flip-flop 193 is connected to the output of gate 196. The clock input to flip-flop 193 is connected to the clock input of flip-flop 195, and to the output of an inverter 198. The Q output of the flip-flop 193 is connected to one input of an AND gate 199, to the reset input of flip-flop 189, and to a control line 200 leading to the MTCU connector 31 and the FCU connector 30 of FIG. 2. The $\overline{Q}$ output of flip-flop 193 also is connected to a control line 201 leading to the control line 151 of FIG. 3a.

The set and reset inputs to the flip-flop 192 are connected to the output of logic one source 190, and the clock input to the flip-flop is connected to the output of an 8 MHz clock source 209. The clock input to flip-flop 192 also is connected to a first input of an AND gate 208.

The D input to flip-flop 189 is connected to the D input of a serial-in-parallel-out (SIPO) eight-bit register 202, and to the output of the logic one source 190. The D input of flip-flop 189 also is connected to the D input of an eight-bit SIPO register 203, and to the set input of a D-type flip-flop 204. The clock input to flip-flop 189 is connected to the output of a NAND gate 205, to one input of EXCLUSIVE OR gate 197 and through an inverter 206 to one input of a NAND gate 207. The Q output of flip-flop 189 is applied to a second input of gate 207, the output of which is applied to second inputs of gates 196 and 199. The output of gate 199 is applied to a second input of gate 208 and to the reset input of flip-flop 204.

The D input to flip-flop 195 is connected to its reset input, to a control line 210, and to the A2 input of a two-to-one multiplexer 211. The Q output of flip-flop 195 is applied to a third input of gate 208. The output of gate 208 is applied to the input of an inverter 212, to the A1-A3 inputs of a four-to-one multiplexer 213, to the A4 input of a four-to-one multiplexer 214 and to the clock input of register 203. The output of inverter 212 is applied to a control line 215, to the clock input of flip-flop 204 and to one input of an AND gate 216.

Referring to multiplexer 211 connected to the D input of flip-flop 195, the enable input to the multiplexer is connected to ground. The A1 input to the multiplexer is connected to the reset input to register 202, and to the output of gate 197. The select input to multiplexer 211 is connected to the output of an AND gate 217 and to the input of an AND gate 218. The Q output of the multiplexer is connected to the reset input of register 203.

Referring to register 203, the D input to the register is connected to the set input of flip-flop 204, and to the output of logic one source 190. The B1 output of register 203 is applied through an inverter 219 to one input of an AND gate 220. The B2 output of the register is applied through an inverter 221 to a second input of gate 218 and to one input of a NOR gate 222.

The D input of flip-flop 204 is connected to its $\overline{Q}$ output, and the Q output of the flip-flop is applied to a second input of gate 216.

The enable input of multiplexer 213 is connected to the output of gate 220, a second input of which is connected to the output of an AND gate 223. The A4 input to multiplexer 213 is connected to the output of gate 216 and to the A1–A3 inputs of multiplexer 214. The select 1 (SEL1) input to multiplexer 213 is connected to one input of gate 217, a second input of which is connected to the output of an inverter 224. The SEL1 input of multiplexer 213 also is connected to the SEL1 input to multiplexer 214, to a second input of gate 222, to one input of gate 223 and to a control line 225 leading to the B2 output of command register 24 of FIG. 3a. The select 2 (SEL2) input to multiplexer 213 is connected to the input of inverter 224, to the SEL2 input of multiplexer 214, to a second input of gate 223 and to a control line 226 leading to the control line 125 of FIG. 3a. The Q output of multiplexer 213 is applied to a data line 227.

The enable input to multiplexer 214 is connected to the output of gate 218, and the Q output of the multiplexer is applied to the clock input of register 202. The B7 output of the register 202 is connected to the two inputs of gate 205, the output of which is applied to a second input to gate 197 and to the input of inverter 206.

A third input to gate 222 is connected to a control line 228 leading to the B6 output of adapter command register 24 of FIG. 3a. The output of gate 222 is applied to a control line 229.

Referring to the clock source 209, the output of the clock source is connected to the clock input of a D-type flip-flop 230 and to the input of an inverter 198. The D input to the flip-flop 230 is connected to its $\overline{Q}$ output, and the Q output of the flip-flop is applied to a control line 231. The reset and set inputs to the flip-flop 230 are connected to the output of the logic one source 190.

A first input to AND gate 418 is connected to the J-input of flip-flop 193, and a second input to gate 418 is connected to the clock input of flip-flop 192. The output of gate 418 is applied to a control line 419.

Figure 3C:
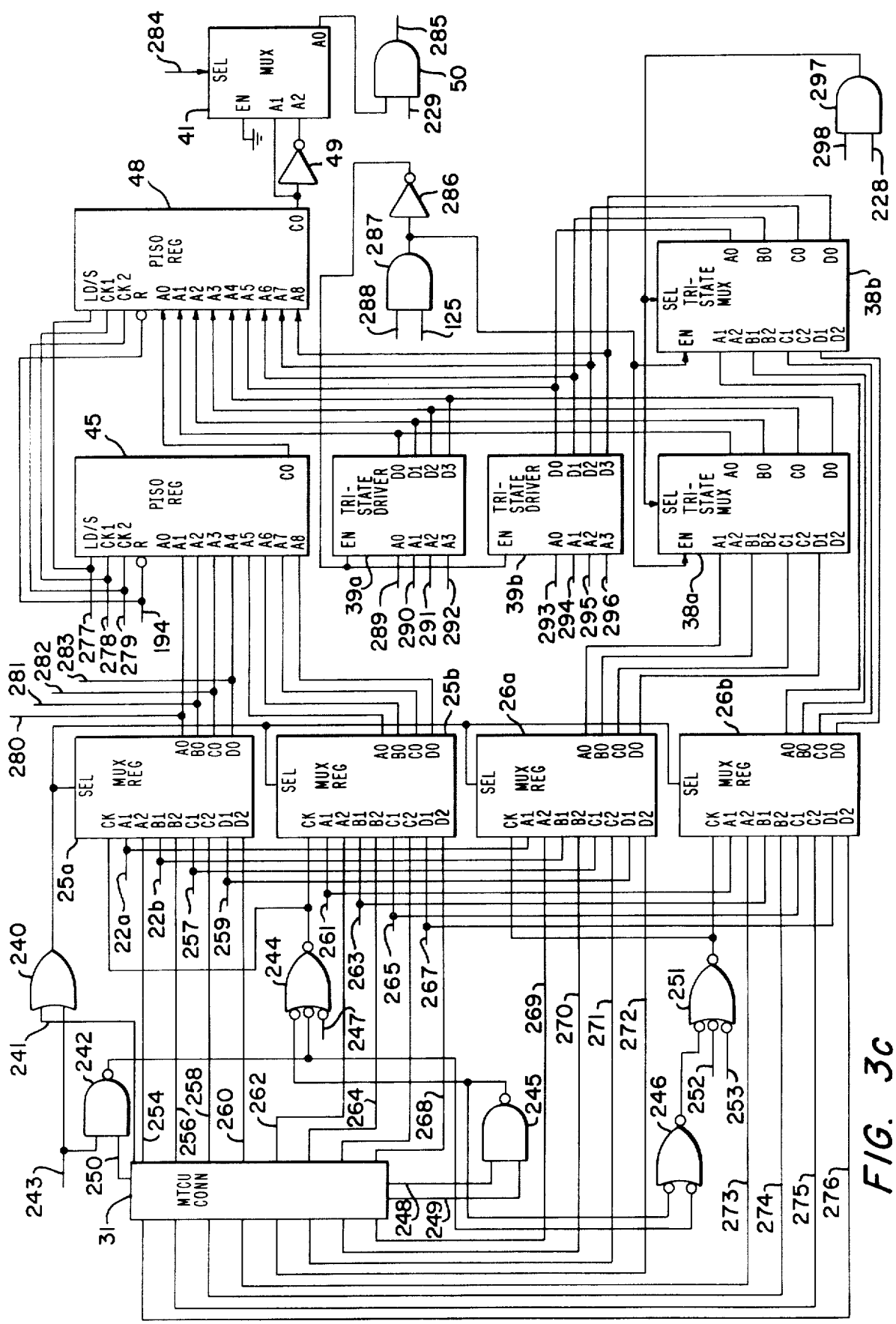

Referring to FIG. 3c, a first input to an OR gate 240 is connected to a control line 241 leading from the MTCU connector 31. A second input to the gate 240 is connected to one input of a NAND gate 242, and to a control line 243 leading to the control line 140 at the B5 output of the device command register 23 of FIG. 3a. The output of gate 240 is applied to the select input of four stage two-to-one multiplexers 25a, 25b, 26a and 26b. Multiplexers 25a and 25b comprise the least significant bit multiplexer register 25 of FIG. 2, and multiplexer registers 26a and 26b comprise the most significant bit multiplexer register 26 of FIG. 2.

The clock inputs to multiplexer registers 25a and 25b are connected to the output of an EXCLUSIVE OR gate 244, one input of which is connected to the output of a NAND gate 245 and to a first input of an EXCLUSIVE OR gate 246. A second input to gate 244 is connected to the output of gate 242 and to a second input to gate 246. A third input to gate 244 is connected to a control line 247 leading to the MPDC connector 21 of FIG. 3a.

A first input to gate 245 is connected to a control line 248 leading from the MTCU connector 31. A second input to the gate 245 is connected to a control line 249 leading from the MTCU connector and a second input to gate 242 is connected to a control line 250 leading from the MTCU connector. The output of gate 245 is connected to control line 187 of FIG. 3b. The output of gate 246 is applied to a first input of an EXCLUSIVE OR gate 251, a second input of which is connected to a control line 252 leading to connector 21 of FIG. 3a. A third input to gate 251 is connected to a control line 253 leading to connector 21, and the output of gate 251 is connected to the clock inputs of multiplexer registers 26a and 26b.

The A1 input to multiplexer register 25a is connected to line 22a leading to connector 21, and to the A1 input of multiplexer register 26a. The A2 input to register 25a is connected by way of a data line 254 and MTCU connector 31 to the MTCU 16 of FIG. 1. The B1 input to register 25a is connected to the B1 input of register 26a, and to a data line 22b leading to the connector 21 of FIG. 3a. The B2 input of register 25a is connected to a data line 256 leading to the connector 31. The C1 input to register 25a is connected to a data line 257 of data cable 22, and to the C1 input of register 26a. The C2 input to register 25a is connected to a data line 258 leading to the connector 31. The D1 input to register 25a is connected to a data line 259 of data cable 22 leading to the connector 21 of FIG. 3a, and to the D1 input of register 26a. The D2 input of register 25a is connected by way of a data line 260 to the connector 31. The A0–D0 outputs of register 25a are connected respectively to the A1–A4 inputs of a register 45, which is an eight bit parallel-in-serial-out (PISO) register. The A0–D0 outputs of register 25a also are connected to data lines 280–283 leading to inputs to the MTCU connector 31.

The A1 input of register 25b is connected to a data line 261 of data cable 22 leading to the MPDC connector 21 of FIG. 3a, and to the A1 input of register 26b. The A2 input to register 25b is connected by way of a data line 262 to the connector 31, which is in electrical communication with the MTCU 16. The B1 input to register 25b is connected to a data line 263 of data cable 22 leading to the connector 21 of FIG. 3a, and to the B1 input of register 26b. The B2 input to register 25b is connected by way of a data line 264 to the MTCU connector 31. The C1 input to register 25b is connected to a data line 265 of data cable 22 leading to the MPDC connector 21, and to the C1 input of register 26b. The C2 input to register 25b is connected by way of a data line 266 to the MTCU connector 31. The D1 input to register 25b is connected to a data line 267 of data cable 22, and to the D1 input to register 26b. The D2 input to register 25b is connected by way of a data line 268 to the MTCU connector 31. The A0–D0 outputs of register 25b are connected respectively to the A5–A8 inputs of register 45, and to inputs of the MTCU connector 31.

The A2, B2, C2 and D2 inputs to register 26a are connected respectively to data lines 269–272 leading to outputs of the MTCU connector 31. The A0 output of register 26a is connected to the A1 input of a four-stage tri-state multiplexer 38a, and to an input to the MTCU connector 31. The B0 output of register 26a is connected to the B1 input to multiplexer 38a, and to an input to the MTCU connector 31. The C0 output of register 26a is connected to the C1 input of multiplexer 38a and to an input to the MTCU connector 31. The D0 output of register 26a is connected to the D1 input of multiplexer 38a and to an input to the MTCU connector 31.

The A2, B2, C2 and D2 inputs to multiplexer register 26b are connected respectively to data lines 273–276 leading to outputs of the MTCU connector 31. The A0 output of register 26b is connected to the A1 input of a four-stage tri-state multiplexer 38b, and to an input of the MTCU connector 31. The C0 output of register 26b is connected to the C1 input of multiplexer 38b, and to an input of the MTCU connector 31. The B0 output of register 26b is connected to the B1 input of multiplexer 38b, and to an input of the MTCU connector 31. The D0 output of register 26b is connected to the D1 input of multiplexer 38b, and to an input of the MTCU connector 31. Multiplexers 38a and 38b comprise multiplexer 38 of FIG. 2.

The load shift input to register 45 is connected to a control line 277 leading to the control line 200 at the Q output of flip-flop 193 of FIG. 3b, and further is connected to the load shift input of register 48 which is an eight-bit PISO register. The clock 1 (CK1) input to register 45 is connected to a control line 278 leading from the output of gate 418 of FIG. 3b, and further is connected to the CK1 input to register 48. The clock 2 (CK2) input to register 45 is connected to a control line 279 leading to the Q output of multiplexer 214 of FIG. 3b, and to the CK2 input of register 48. The reset input to register 45 is connected to control line 194 of FIG. 3b, and to the reset input of register 48. The C0 output of register 45 is connected to the A0 input of register 48.

The A1-A4 inputs to register 48 are connected respectively to the D0-D3 outputs of a tri-state driver 39a, and to the A0-D0 outputs of tri-state multiplexer 38a. The A5-A8 inputs to register 48 are connected respectively to the D0-D3 outputs of a tri-state driver 39b, and to the A0-D0 outputs of tri-state multiplexer 38b. The tri-state drivers 39a and 39b comprise tri-state driver 39 of FIG. 2.

The carry-out (C0) output of register 48 is applied to the A1 input of multiplexer 41, and through inverter 49 to the A2 input of the multiplexer. The enable input to the multiplexer 41 is connected to ground, and the select input is connected to a control line 284 leading from the B0 output of multiplexer 400 of FIG. 3a. The A0 output of multiplexer 41 is connected to one input of AND gate 50, a second input of which is connected to control line 229 leading from the output of gate 222 of FIG. 3b. The output of gate 50 is connected to data line 285.

Referring to tri-state drivers 39a, 39b, the enable inputs of the drivers are connected to the output of an inverter 286 having an input connected to the output of an AND gate 287. A first input to gate 287 is connected to control line 125 of FIG. 3a, and a second input to the gate is connected by way of a control line 288 to the output of OR gate 128 of FIG. 3a. The A0-A3 inputs to driver 39a are connected to control lines 289-292, respectively. Further, the A0-A3 inputs to driver 39b are connected to data lines 293-296, respectively.

The select inputs to multiplexers 38a and 38b are each connected to the output of an AND gate 297. The A2, B2, C2 and D2 inputs to multiplexer 38a are connected to data lines 299a-299d, respectively, leading from data outputs of the FCU connector 46 of FIG. 2. The A2, B2, C2 and D2 inputs of multiplexer 38b are connected to data lines 299e-299h, respectively, which also lead from data outputs of the FCU connector 46.

A first input of gate 297 is connected to control line 298 leading from the output of inverter 401 of FIG. 3a. A second input to gate 297 is connected to a control line 228 leading to the B6 output of command register 24 of FIG. 3a.

Figure 3D:
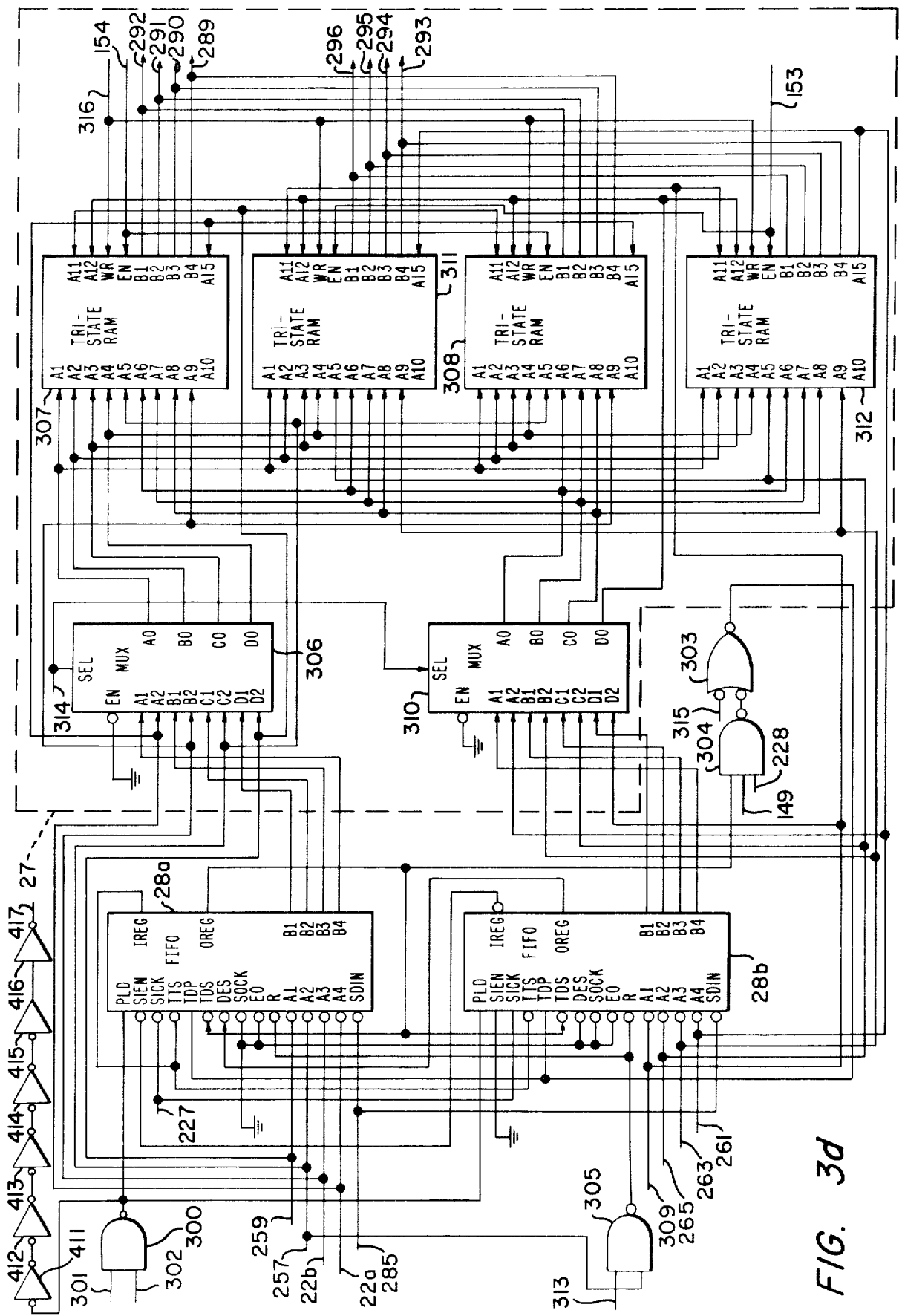

Referring to FIG. 3d, the output of an AND gate 300 is connected to the parallel load (PLD) input of a first-in-first-out (FIFO) 28a, and to the PLD input of a FIFO 28b. The output of gate 300 further is connected to control line 253 of FIG. 3c. A first input to gate 300 is connected to a control line 301 leading to connector 21 of FIG. 3a, and a second input to the gate is connected to a control line 302 leading to the output of NOR gate 132 of FIG. 3a.

The serial-in-enable input (SIEN) of FIFO 28a is connected to the input register (IREG) output of FIFO 28b. The serial-in-clock input (SICK) of FIFO 28a is connected to control line 227 leading to the output of multiplexer 213 of FIG. 3b and further is connected to the SICK input of FIFO 28b. The transfer to serial (TTS) input of FIFO 28a is connected to the TTS input of FIFO 28b, and to the IREG output of FIFO 28a which in turn is connected to control line 210 of FIG. 3b. A transfer-out-parallel (TOP) input of FIFO 28a is connected to the TOP input of FIFO 28b, and to the output of an EXCLUSIVE OR gate 303. The transfer output serial (TOS) input to FIFO 28a is connected to the TOS input of FIFO 28b, to an input of a NAND gate 304 and to the output register (OREG) output of FIFO 28a. The output-enable-serial (OES) input to FIFO 28a is connected to the OREG output of FIFO 28b.

The serial-out-clock (SOCK) input to FIFO 28a is connected to ground, to the enable output (EO) input to FIFO 28a, to the OES input to FIFO 28b, and to the SOCK and EO inputs to FIFO 28b. The reset input to FIFO 28a is connected to the reset input to FIFO 28b and to the output of a NAND gate 305. The A1 input to FIFO 28a is connected to data line 259 of cable 22, to the D2 input of a four-stage two-to-one multiplexer 306, to the A11 input of a 256×4 bit tri-state RAM 307 and to the A11 input of a 256×4 bit tri-state RAM 308. The A2 input to FIFO 28a is connected to data line 256 of cable 22, to a first input of gate 305, to the C2 input of multiplexer 306, to the A5 input of RAM 307, and to the A5 input of RAM 308. The A3 input to FIFO 28a is connected to data line 22b of FIG. 3a, to the B2 input of multiplexer 306, to the A9 input of RAM 307 and to the A9 input of RAM 308. The A4 input to FIFO 28a is connected to data line 22a of FIG. 3a, to the A2 input of multiplexer 306, to the A15 input of RAM 307 and to the A15 input to RAM 308. The serial data in (SDIN) input to FIFO 28a is connected to control line 285 leading to the output of gate 50 of FIG. 3c and to the SDIN input of FIFO 28b.

The B1 output of FIFO 28a is connected to the D1 input of multiplexer 306, and to data line 156 leading to the A0 input of multiplexer 114 of FIG. 3a. The B2 output of the FIFO is connected to the C1 input to the multiplexer 306, and to the data line 159 leading to the A0 input of multiplexer 306 of FIG. 3a. The B3 output of FIFO 28a is connected to the B1 input of multiplexer 306, and to data line 162 leading to the A0 input of multiplexer 116 of FIG. 3a. The B4 output of FIFO 28a is connected to the A1 input of the multiplexer 306, and to the data line 165 leading to the A0 input of multiplexer 117 of FIG. 3a.

The SIEN input to FIFO 28b is connected to ground. The A1 input to FIFO 28b is connected to a data line 309 of cable 22 leading to the MPDC connector 21 of FIG. 3a. The A1 input of FIFO 28b further is connected to the D2 input of a four-stage two-to-one multiplexer 310, to the A11 input of a 256×4 bit tri-state RAM 311 and to the A11 input of a 256×4 bit tri-state RAM 312. The A2 input to FIFO 28b is connected to data ine 265 of cable 22, to the C2 input of multiplexer 310, to the A5 input of RAM 311 and to the A5 input of RAM 312. The A3 input to FIFO 28b is connected to data line 263 of cable 22, to the B2 input of multiplexer 310, to the A9 input of RAM 311 and to the A9 input of RAM 312. The A4 input to FIFO 28b is connected to data line 261 of cable 22, to the A2 input of multiplexer 310, to the A15 input of RAM 311 and to the A15 input of RAM 312. The B1 output of FIFO 28b is connected to the D1 input of multiplexer 310, and to the data line 168 leading to the A0 input of multiplexer 118 of FIG. 3a. The B2 output of FIFO 28b is connected to the C1 input of multiplexer 310, and to the data line 171 leading to the A0 input of multiplexer 119 of FIG. 3a. The B3 output of FIFO 28b is connected to the B1 input of multiplexer 310, and to the data line 174 leading to the A0 input of multiplexer 120 of FIG. 3a. The B4 output of FIFO 28b is connected to the A1 input of multiplexer 310, and to data line 177 leading to the A0 input of multiplexer 121 of FIG. 3a. The B1-B4 output of FIFOs 28a and 28b further are connected to the A1 input of the FCU connector 30 of FIG. 2. FIFOs 28a and 28b comprise FIFO 28 of FIG. 2.

A second input to gate 305 at the reset input of FIFO 28b is connected to a control line 313 leading to the MPDC connector 21 of FIG. 3a.

The enable input to multiplexer 306 is connected to ground. The select input to the multiplexer is connected to the select input of multiplexer 310, and to a control line 314 leading to the output of gate 287 of FIG. 3c. The A0 output of the multiplexer 306 is connected to the A1 input to RAMs 307, 308, 311 and 312. The B0 output of multiplexer 306 is connected to the A2 inputs of the RAMs, and the C0 output of the multiplexer is connected to the A3 inputs of the RAMs. The D0 output of multiplexer 306 is connected to the A4 inputs of the RAMs.

The enable input to multiplexer 310 is at a logic zero ground. The A0 output of the multiplexer is connected to the A6 inputs of RAMs 307, 308, 311 and 312. The B0 output of multiplexer 310 is connected to the A7 inputs of the RAMs, and the C0 output of the multiplexer is connected to the A8 inputs to the RAMs. The D0 output of the multiplexer 310 is connected to the A12 inputs to the RAMs.

A second input to gate 304 is connected to control line 149 leading to the $\overline{Q}$ output of flip-flop 104 of FIG. 3a, and a third input to gate 304 connected to control line 228 at one input of gate 222 of FIG. 3b. The output of gate 304 is connected to a first input of gate 303, a second input of which is connected to a control line 315 leading to the MPDC connector 21 of FIG. 3a. A third input to gate 303 is connected to a control line 317 leading to an output of the FCU 15 by way of FCU connector 30 of FIG. 2.

The write enable (WR) input to RAM 307 is connected to the WR input to RAM 308 and to a control line 316 leading to the MPDC connector 21 of FIG. 3a. The enable (EN) input to RAM 307 is connected to control line 154 of FIG. 3a, and to the EN input to RAM 308. The B1 output of RAM 307 is connected to data line 292 leading to the A3 input of driver 39a of FIG. 3c, to the B1 output of RAM 308 and to data line 157 leading to the A3 input to multiplexer 114 of FIG. 3a. The B2 output of RAM 307 is connected to control line 291 leading to the A2 input of driver 39a of FIG. 3c, to the B2 output of RAM 308, and to data line 160 leading to the A3 input of multiplexer 115 of FIG. 3a. The B3 output of RAM 307 is connected to data line 290, to the B3 output of RAM 308, and to data line 163 leading to the A3 input of multiplexer 116 of FIG. 3a. The B4 output of RAM 307 is connected to data line 289 leading to the A0 input of driver 39a of FIG. 3c, to the B4 output of RAM 308, and to data line 166 leading to the A3 input of multiplexer 117 of FIG. 3a.

The enable (EN) input to RAM 312 is connected to the EN input to RAM 311, and to control line 153 of FIG. 3a. The WR input to RAM 311 is connected to the WR input of RAM 312, and to control line 316. The B1 output of RAM 311 is applied to data line 296 leading to the A3 input of driver 39b of FIG. 3c, to the B1 output of RAM 312, and to data line 169 leading to the A3 input of multiplexer 118 of FIG. 3a. The B2 output of RAM 311 is connected to control line 295 leading to the A2 input of driver 39b of FIG. 3c, to the B2 output of RAM 312, and to a data line 172 leading to the A3 input of multiplexer 119 of FIG. 3a. The B3 output of RAM 311 is connected to data line 294 leading to the A1 input of driver 39b of FIG. 3c, to data line 175 leading to the A3 input of multiplexer 120 of FIG. 3a, and to the B3 output of RAM 312. The B4 output of RAM 311 is connected to control line 293 leading to the A0 input of driver 39b of FIG. 3c, to the B4 output of RAM 312, and to data line 178 leading to the A3 input to multiplexer 121 of FIG. 3a.

The output of gate 300 further is applied through serially connected inverters 411-416 to control line 417 leading to control line 185 of FIG. 3b.

OPERATION

In operation, the MPDC 10 supplies both data and control information to the tape adapter logic system of FIGS. 3a-3d by way of MPDC connector 21 of FIG. 3a. The control information is routed through data cable 22, and loaded into the device command register 23 and the adapter command register 24.

The device command register 23 is loaded by the MPDC 10 with tape motioncontrol information for the FCU 15 and the MTCU 16. More particularly, in response to a clock signal supplied by the MPDC 10 on control line 100, a four-bit encoded command word is loaded from cable 22 into register 23 to appear at the B0-B3 outputs of the register. The encoded command word provides read forward, rewind, rewrite, backspace and other tape motion commands for either the FCU 15 or the MTCU 16. If the command word is forwarded to the MTCU 16, the MTCU forms a function code comprised of the command word and one of the B4-B7 outputs of register 23 as a strobe.

The adapter command register 24 is loaded from the data cable 22 in response to an MPDC clock signal on line 101. An encoded two-bit word at the B0 and B1 outputs of register 24 are select lines for the multiplexer 400 of FIG. 3a. When the system is installed, switches 402-405 are set to indicate the device type. If channel two is to indicate the FCU 15, switch 404 shall be closed. The data paths for the FCU 15 thereupon shall be enabled when line 134 is at a logic zero level and line 133 is at a logic one level. If channel zero is to indicate the MTCU 16, switch 402 shall be open and the data path to MTCU 16 shall be enabled when lines 133 and 134 are each at a logic zero level. In addition, the B2 output of register 24 controls the selection of either a 1×1 read/write or a 4×3 read/write operation. More particularly, if the B2 output is at a logic zero level, a 1×1 operation occurs. A 4×3 pack-depack operation occurs, however, if the output is at a logic one level.

The B3 output of register 24 controls a select line to the multiplexers 114-121 to select the high order four bits of the composite output of the multiplexers. The B4 and B5 outputs of the register 24 control the selection of the type of code conversion to be performed by the code converter 27 of FIG. 3d as will be further explained. If the B5 output is at a logic one level, a code conversion one is selected. If the B4 output is at a logic one level, however, a code conversion two is selected. If neither the B4 nor the B5 outputs are at a logic one level, no code conversion occurs.

In response to the B4 and B5 outputs, gate 128 indicates when either of two code conversions is requested. The output of gate 128 is applied to NOR gate 132 which also is responsive to the B2 output of register 24. The output of gate 132 transitions to a logic zero level when either a code conversion or a 4×3 packing is required as shall be further explained.

The B6 output of register is at a logic one level when data is to be received from the FCU 15 or the MTCU 16, and forwarded to the MPDC 10 by way of connector 53. If the B7 output of register 24 is at a logic one level, a write operation is commanded. In that event, data shall be received from the MPDC connector 21, and supplied to the FCU connector 46 of FIG. 2. Gate 123 signals the occurrence of any data transfer between the tape adapter 14 and the MPDC 10.

The B7 output of register 24 further is applied through inverter 124 to indicate the direction of data flow between the MPDC 10, the FCU 15 and MTCU 16. If the output of inverter 124 transitions to a logic zero level to signal the occurrence of a data write operation, data is transferred from the MPDC connector 21 to the FCU connector 30 of FIG. 2. If the output of inverter 124 is at a logic one level, however, the data transfer is from the MTCU connector 31 or the FCU connector 46 to the MPDC connector 53.

Gate 122 is responsive to gate 128, to the B2 and B7 outputs of register 24, and to a clock signal on line 151 to be further explained. If data is to be transferred from connector 21 to the input registers of the FIFOs 28a and 28b of FIG. 3d, the output of gate 122 shall transition to a logic zero level. A data byte thereupon is transferred from connector 21 to the FIFOs 28a and 28b. If a data read operation has been requested, the output of gate 122 shall also transition to a logic zero in response to an output register full signal from the FIFOs to the MPDC 10. The MPDC 10 thereby is notified that a data byte is available for transfer from the FIFOs.

If data from the tape adapter 14 is to be transferred to the MPDC 10, the MPDC supplies an adapter enable signal on line 113 to enable the outputs of multiplexers 114 through 121. In addition, the SEL1, SEL2 and SEL3 inputs to the multiplexers are energized to select either the FIFO 28 or code converter 27 outputs. More particularly, if the output of FIFOs 28a, 28b at the A0 inputs of the multiplexers is to be selected, each of the select inputs to the multiplexers shall be at a logic zero level. If the output of code converter 27 at the A3 inputs of the multiplexers is requested, both the SEL1 and SEL2 inputs to the multiplexers shall be at a logic one level. All other logic combinations of SEL1, SEL2 and SEL3 select the multiplexers to status collection inputs.

The logic level of the SEL1 and SEL2 inputs are controlled by gate 110, the output of which is at a logic one level when a hardware data path is enabled, and a read operation and a code conversion are requested. The read with code conversion request appears at the output of gate 144 and in response to both an MPDC read request on line 145 and gate 128. The MPDC supplies a hardware enable signal by way of line 108 and inverter 109.

In operations other than a read with code conversion, the SEL1 inputs to multiplexers 114-121 are controlled by the MPDC control line 111 and the SEL2 inputs are controlled by the MPDC control line 106. If the MPDC 10 requires data or status information from the tape adapter 14, the MPDC transitions control line 113 to a logic zero level to enable the multiplexers 114-121.

The SEL 3 inputs to the multiplexers are controlled by the B3 output of the adapter command register 24, which signals the occurrence of an extended status state. If the high order data bits of multiplexers 114-121 are to be selected, the MPDC loads the adapter command register 24 to raise line 131 to a logic one level. The A4 through A7 inputs of each multiplexer thereby are selected independently by the logic level of the SEL2 and SEL1 inputs.

In the event there is to be a data transfer from MPDC 10 to either the FCU 15 or the MTCU 16, the flip-flop 104 is set. More particularly, if the data bit 6 line 22b of data cable 22 connected to the D input of the flip-flop is at a logic one level, and both the data bit 7 line 22a of cable 22 and the adapter strobe signal on line 105 are at a logic one level, the gate 103 shall trigger the flip-flop 104 to transition the Q output thereof to a logic one level. The Q output of the flip-flop shall remain at a logic one level until the MPDC 10 issues a logic zero clear signal on line 147. The clear signal indicates that the data range has been depleted, and that the data transfer is complete.

In summary, the command register 24 selects data paths through which data is to flow during a read or a write operation. Successive data operations require successive loads to the command registers. A data read operation involves the routing of data from either the MTCU connector 31 or the FCU connector 46 to the MPDC connector 53. A data write operation involves the routing of data from the MPDC 10 to the FCU connector 30 of FIG. 2.

Referring to FIG. 3b, which illustrates the invention in logic diagram form, OR gate 183 selects an eight bit data load or a sixteen bit data load by setting flip-flop 189. An eight bit data load is indicated when the output of gate 183 is at a logic zero level. Gate 183 is controlled by strobe signals on lines 185 and 186 from the MPDC 10 and the FCU connector 46 of FIG. 2, respectively. A logic zero strobe signal is issued by MPDC 10 to line 185 to request a 1×1 data write with code conversion. A logic zero strobe signal is issued by the FCU 15 to line 186 to indicate that valid read data is available from the FCU 15 of FIG. 2.

OR gate 184 triggers the flip-flop 188 when data is available for a transfer. The gate is responsive to a signal on line 187 leading from the output of gate 245 of FIG. 3c, which indicates that the MTCU 16 has supplied 16 data bits to the data bus leading to the tape adapter 14. A logic zero level on line 185 indicates that data is to be transferred in a one-by-one write with code conversion operation to the FCU 15. A logic zero level on line 186 signals the presence of valid read data from the FCU 15.

The flip-flop 188 provides a logic signal at its Q output which is synchronized by flip-flop 192 to an 8 MHz clock signal supplied by the clock source 209. The synchronized signal at the Q output of flip-flop 192 is supplied to the J input of flip-flop 193, and to one input of gate 418. Upon the occurrence of a next rising edge of the 8 MHz clock signal, the flip-flop 193 resets the flip-flop 188 by way of gate 191. In addition, the Q output of flip-flop 193 is applied to gate 199, which is enabled by gate 207. The output of gate 199 in turn enables gate 208. The gate 208 supplies an 8 MHz clock signal when the Q output of flip-flop 195 indicates that the input register of FIFOs 28a and 28b are empty and may be loaded. The gate 208 clock signal is one of two clock signals used to shift data out of the PISO registers 45 and 48 of FIG. 3c, and into FIFOs 28a and 28b of FIG. 3d. The output of gate 418 is the load clock for PISO registers 45 and 48.

The gate 191 resets flip-flop 188 in response to the $\bar{Q}$ output of flip-flop 193 and the clear adapter strobe signal from the MPDC 10 on line 194. The strobe signal is generated by firmware in the MPDC to clear the tape adapter logic at the beginning of each data transfer operation. The flip-flop 188 thereby is reset before data is parallel-loaded into the registers 45 and 48 of FIG. 3c.

The flip-flop 189 is set to accommodate an eight-bit data load during either a 1×1 write with code conversion or a data read from the FCU 15. If a read from the MTCU 16 is requested, the Q output of the flip-flop transitions to a logic one when the flip-flop is triggered by gate 205 since the D input to the flip-flop is at a logic one level. The output of gate 205 transitions to a logic one level only after eight bits have been shifted out of the shift registers 45 and 48 of FIG. 3c.

The Q output of flip-flop 189 is applied to gate 207 which is enabled by gate 205. The output of gate 207 is applied to one input of gate 199 to disable gate 208 during a reset sequence, and further is applied through gate 196 to reset flip-flop 193 when either the output of gate 207 transitions to a logic zero level or the MPDC 10 issues a clear adapter strobe to line 194.

The reset input to register 203 is supplied by the 2×1 multiplexer 211, the select input of which is controlled by gate 217. When neither a 4×3 pack-depack nor a write operation is requested, the output of gate 217 is at a logic zero level to select the A1 input of multiplexer 211. When a 4×3 pack-depack is requested, but a write operation is not, the gate 217 output is at a logic one level to select the A2 input of the multiplexer. Gate 217 also supplies an input to gate 218, the output of which is in a logic zero state during a data write operation which does not include a 4×3 pack-depack.

The A1 input to multiplexer 211 is supplied by gate 197, which in turn is responsive to both gate 205 and the MPDC 10 clear adapter signal on line 194. Thus, the reset signal at the output of gate 197 is generated either at the clear adapter time, or after eight bits have been shifted out of the PISO registers 45 and 48 of FIG. 3c. The A2 input to multiplexer 211 is supplied by the input registers of FIFOs 28a and 28b, and is at a logic zero level when the input registers of the FIFOs are full.

When the shift register 203 is pulsed by the output of gate 208, the logic one data input to the shift register is stepped through the register outputs. The B1 output of shift register 203 is applied through inverter 219 and OR gate 220 to enable the output of the multiplexer 213. Thus, the output of the multiplexer is enabled after the second clock pulse to the shift register 203 occurs. The multiplexer output also is enabled when the output of gate 223 transitions to a logic zero level to indicate that neither a 4×3 pack-depack nor a write operation has been requested.

The B2 output of shift register 203 is applied through inverter 221 and gate 218 to enable the output of multiplexer 214. Thus, after the third shift pulse is applied to register 203, the multiplexer 214 is enabled. The output of inverter 221 also is applied to gate 222 to provide a data enable signal on line 229 to enable gate 50 of FIG. 3c. The multiplexer 214 further is enabled when the output of gate 217 is at a logic zero level, thereby indicating that a 4×3 read operation is not selected. Serial data thereupon is supplied to FIFOs 28a and 28b.

When line 225 leading to the B2 output of adapter command register 24 is at a logic zero level, the output of gate 222 shall be raised to a logic one level during data transfer operations other than a 4×3 pack-depack operation. Gate 222 also supplies a logic one level when the B6 output of command register 24 lowers line 228 to a logic zero state to indicate that a read data operation is not requested.

A second shift register clock signal is provided by AND gate 216, a first input of which is the negation of the before-described shift register clock signal supplied by gate 208. A second input to gate 216 is supplied by the Q output of flip-flop 204 whose set input is disabled by the output of the logic one source 190. The D input of flip-flop 204 is tied to the $\bar{Q}$ output of the flip-flop to alternate the logic level of the Q output in response to the negation signal of inverter 212. The clock signal at the output of gate 216 is delayed 62.5 nanoseconds from the clock signal of gate 208.

A clock pulse occurs at the output of gate 216 each time that both the output of inverter 212, and the output of gate 199 is at a logic one level. The output of gate 216 is applied to the A4 input of multiplexer 213, and to the A1-A3 inputs of multiplexer 214. If the tape adapter 14 is in either a 4×3 pack-depack mode or a data write mode, but not both, the Q outputs of multiplexers 213 and 214 shall be selected to their A1-A3 inputs. If the tape adapter is neither in a 4×3 pack-depack mode nor a write mode, the outputs of multiplexers 213 and 214 shall be selected to their A4 inputs. Further observation of multiplexers 213 and 214 indicates that the A4 inputs of each multiplexer also are selected if the tape adapter is in both a 4×3 pack-depack mode and a write mode.

The Q output of multiplexer 214 is applied to the clock input of shift register 202, and to the CK2 inputs to the PISO registers 45 and 48. Upon the occurrence of a rising edge in the clock signal, the registers 202, 45 and 48 shift one position.

The reset input to the shift register 202 is supplied by gate 197, and the data input is supplied by the logic one source 190. After eight rising pulse edges occur in the Q output of multiplexer 214, the B7 output of shift register 202 shall transition to a logic one level. If an eight bit data shift has occurred in response to data received from the MPDC 10 or the FCU 15, rather than in response to a first half of sixteen data bits received from the MTCU 16, flip-flop 193 shall be reset. Otherwise, the reset input to flip-flop 189 will be disabled.

Flip-flop 230 is a D-type flip-flop which is placed in a toggle mode. The Q output of the flip-flop thereupon transitions to a logic one level in response to every other logic one pulse supplied by the 8 MHz clock source 209. A 4 MHz clock signal thereby is provided to line 231 leading to the MTCU connector 31.

In summary, the logic timing system of FIG. 3b may accommodate both eight bit data byte and sixteen bit data word transfers as indicated by the output of gate 183. In addition, the timing system is activated by each of three data sources: the MPDC 10 by way of line 185, the FCU 15 by way of line 186 and the MTCU 16 by way of line 187. The operation of the logic timing system is synchronized with the 8 MHz clock source 209 by flip-flop 192.

At the beginning of each data transfer, the MPDC 10 issues a clear signal to line 194 to clear the tape device adapter logic. Data transfer requests to the FCU 15 and the MTCU 16 are supplied by the Q output of flip-flop 193 on line 200, which indicates the status condition of the tape device adapter to the FCU 15 and the MTCU 16. A next data byte is requested only after a current data byte has been loaded into the input registers of FIFOs 28a and 28b of FIG. 3d as shall be further explained. A further protection against data loss is provided by flip-flop 195, the Q output of which transitions to a logic one level only when the input registers of FIFOs 28a and 28b are empty. Such an empty condition is indicated by a logic one signal on line 210 from the input register of the FIFO 28a. The line 210 thereby may place the logic timing system in a wait mode during a data transfer in the event that the transfer rate of data into the tape device adapter 14 exceeds the transfer rate of data out of the tape device adapter.

In the preferred embodiment described herein, the FCU 15 may operate at an 8 MHz rate to accept or transfer a megabyte of data per second in burst mode. The average transfer rate to and from the FCU 15 during a normal operation mode is approximately 170 kilobytes per second. In the event data transfer delays occur in information exchanges between the FCU 15 and the MPDC 10, the logic timing system may enter into a burst mode with the FCU 15 and the MPDC 10 to provide a transfer rate of one megabyte per second to maintain the average transfer rate of 170 kilobytes per second.

The logic timing system of FIG. 3b provides three basic clock signals. A first clock signal is a 4.0 MHz signal provided at the Q output of flip-flop 230 for the MTCU 16. Since sixteen bit data words and not eight bit data bytes are read from the MTCU 16, only one-half the number of load pulses to PISO registers 45 And 48 are required.

Gates 208 and 216 provide two 8 MHz clock signals, with the clock signal of gate 216 delayed from that of gate 208. In the preferred embodiment disclosed herein, such delay is of the order of 62.5 nanoseconds. Data transfers between the PSIOs 45 and 48 of FIG. 3c, and the FIFOs 28a and 28b of FIG. 3d are controlled by the clock signals of gates 208 and 216 as applied by multiplexers 213 and 214. More particularly, the Q output of multiplexer 213 is applied to the SICK inputs to FIFOs 28a and 28b to control the shifting of data through the FIFOs. The Q output of multiplexer 214 is applied to the CK2 input of PISOs 45 and 48 to control the shifting of data through the PISOs to the FIFOs.

Further variations in the phase relationships between the clock signals at the Q outputs of multiplexers 213 and 214 are effected by the SIPO register 203, which enables the outputs of the multiplexers 213 and 214. With the outputs of the register 203 connected as illustrated in FIG. 3b, the phase relationship between the Q outputs of multiplexers 213 and 214 may be changed to accommodate both $1 \times 1$ and $4 \times 3$ data reads and data writes for eight bit and sixteen bit data transfers as shall be further explained. By connecting the input of inverter 219 to the B2 rather than the B1 output of SIPO register 203, and the input of inverter 221 to the B3 rather than the B2 output of register 203, an $8 \times 5$ pack-depack data operation may be provided. If the input to inverter 219 is connected to the B0 rather than the B1 output of register 203, and the input of inverter 221 is connected to the B1 rather than the B2 output of register 203, an $8 \times 7$ pack-depack data operation may be provided.

If the input of inverter 219 is connected to the B6 output rather than the B1 output of register 203, and the input of inverter 221 is connected to the B7 rather than the B2 output of register 203, the logic timing system of FIG. 3b may provide an $8 \times 9$ pack-depack data operation with the addition of four logic gates and an in inverter as shall be further described.

It is thus apparent that the logic layout of the logic timing system as illustrated in FIG. 3b provides substantial flexibility in accommodating the transfer of information between data processing system devices having different data formats, densities, code conventions and transfer rates.

Referring to FIG. 3c, multiplexer registers 25a, 25b and 26a, 26b are used for three specific functions. One function is to latch sixteen bits of data supplied by the MTCU 16 through connector 31a, and a second is to store sixteen bits of data supplied by the MPDC 10 by way of connector 21 during a diagnostic wrap-around test. A third function is to provide two eight-bit storage registers for the firmware resident in the MPDC 10.

If the MPDC 10 requires storage of data bytes, the MPDC supplies a logic zero signal by way of connector 21 to line 247. Gate 244 thereupon supplies a clock signal to multiplexer registers 25a, 25b. The MPDC further may supply a logic zero signal to line 252 to provide a clock signal to multiplexer registers 26a, 26b.

When the MPDC 10 requests status information from the MTCU 16, the device command register 23 of FIG. 3a issues a logic one signal to line 140 to indicate to the MTCU that the next information byte frm the MTCU 16 shall be an input status byte. The output of gate 240 thereupon transitions to a logic one level to select the B-inputs of multiplexer registers 25a, 25b, 26a and 26b. When the status byte is to be presented to the MTCU connector 31a, the MTCU issues a logic signal to line 250 leading to an input of gate 242 to generate clock signals at the outputs of gates 244 and 251. The information byte thereby is loaded into multiplexer registers 25a, 25b, 26a and 26b, and supplied to the MPDC by way of the status inputs (not shown) to multiplexer 33 of FIG. 3a.

As before described in connection with the description of FIG. 2, an MTCU configuration word is loaded by the MPDC 10 into the multiplexer registers 25a, 25b and 26a, 26b when data is to be read from the MTCU 16. The outputs of the registers are applied to inputs of MTCU connector 316. The MTCU 16 thereafter presents sixteen data bits to the tape adapter by way of connector 31a. The MTCU further supplies a sequence of control signals to load the data bits into registers 25a, 25b and 26a, 26b. More particularly, the MTCU 16 issues a logic one signal to line 248 to indicate that the data is from the MTCU, and issues a logic one signal to control lines 241 to select the B-inputs of multiplexer registers 25a, 25b, 26a and 26b. The MTCU further supplies a logic one signal to line 249 to indicate that the data shall be routed through connector 31a. In response thereto, clock signals are generated at the output of gates 244 and 251 as before described.

When the registers are selected to their MTCU inputs, the least significant MTCU data is applied through the registers 25a and 25b to the A1-A8 inputs of PISO register 45. The most significant bits of the MTCU data are applied through the registers 26a and 26b to the odd numbered inputs of multiplexers 38a and 39b, respectively.

During a data read operation, the adapter command register 24 of FIG. 3a issues a logic one signal to its B6 output which is applied to line 228. In addition, the register 24 issues a logic signal from its B1 output to line 298 to identify either the FCU 15 or the MTCU 16 as the data source. The output of gate 297 thus is at a logic zero level during a data read operation if the MTCU 16 is the data source. The tri-state multiplexers 38a and 38b thereby are selected to their odd numbered inputs. The outputs of the tri-state multiplexers 38a and 38b are enabled only when the output of gate 287 is at a logic zero level. Such a condition occurs when the MPDC commands a read, or write without code conversion.

The outputs of the registers 25a, 25b and the multiplexers 38a, 38b are loaded respectively into PISO registers 45 and 48 in response to a logic zero signal from flip-flop 193 on line 277 and a load clock pulse from gate 418 on line 278 by way of line 419. Line 277 thereafter transitions to a logic one level to place the PISO registers 45 and 48 in a shift configuration, and the MTCU data is shifted through the registers in response to the clock signal on line 279.

When data is being read from the MTCU 16, the B0 output of adapter command register 24 is at a logic one level to select multiplexer 41 to its A2 input. The MTCU data then is applied through gate 50 to the SDIN inputs of FIFOs 28a and 28b of FIG. 3d.

When data is to be read from the FCU 15, line 298 is at a logic zero level to select the multiplexers 38a and 38b to their even numbered inputs. The FCU data on lines 299a-299h thereby applied to the A1-A8 inputs of PISO register 48. The read operation then proceeds as before described for the MTCU except that the line 284 transitions to a logic zero level to select the multiplexer 41 to its A1 input.

If sixteen bits of MTCU data are to be loaded into the multiplexer registers 25a, 25b, 25c and 25d, the MPDC 10 issues a logic one signal to line 243 to not only select the registers to the MTCU data outputs but also to provide a load signal by way of gates 244 and 251. If an eight-bit data write is to occur, however, the MPDC 10 issues a logic one signal to line 253 to load only multiplexer registers 26a and 26b. Since a read operation from the FCU 15 is not commanded, gate 297 transitions to a logic zero level to select multiplexers 38a and 38b to their odd numbered inputs.

In the event that a 1×1 write with code conversion or a 4×3 write with code conversion is commanded by the MPDC 10, the output of gate 287 transitions to a logic one level to enable the outputs of drivers 39a and 39b. The outputs of multiplexers 38a and 38b are disabled. The coded information at the outputs of drivers 39a and 39b thereupon are applied respectively to the A1-A8 inputs of register 48. The multiplexer 41 is selected to its A1 input, and the data transfer proceeds as before described.

If a 4×3 write without code conversion is commanded by the MPDC 10, the output of gate 287 transitions to a logic zero level to enable the outputs of multiplexers 38a and 38b and disable the drivers 39a, 39b. Otherwise, the data transfer occurs as described for a 4×3 write with code conversion.

Referring to FIG. 3d, data from the MPDC connector 21 of FIG. 3a is presented to the parallel inputs of FIFOs 28a and 28b during a data write. A built-in de-skew of approximately 100 nanoseconds is applied to the data as it passes through the FIFOs. More particularly, the MPDC 10 issues a logic one strobe signal on line 301 leading to gate 300. If neither a code conversion nor a 4×3 pack-depack is requested, the output of gate 300 transitions to a logic one level and the data is parallel loaded into the input registers of FIFOs 28a and 28b. In response to the trailing edge of the gate pulse, the FIFOs issue logic zero signals at the IREG outputs to indicate to the MPDC 10 that the input register is full. The IREG output of FIFO 28a further is applied to the TTS inputs of each FIFO to transfer the data from the input registers into the FIFO stacks. The IREG outputs of the FIFOs thereupon transition to a logic one level to indicate to the MPDC 10 that another data byte may be loaded. After approximately 90 nanoseconds, a data byte is presented at the B1-B4 outputs of the FIFOs. Upon being filled, the output registers of the FIFOs issue logic signals at their OREG outputs. The TOS inputs of each FIFO, and the OES input to FIFO 28a thereby are disabled. In addition, the OREG outputs are sensed by the FCU 15 during a data write to detect the occurrence of data in the output registers. When the FCU is ready to accept a data byte from the FIFOs, the FCU issues a logic zero signal by way of FCU connector 46 to line 317 to transfer the data byte out of the output registers of the FIFOs. The data byte thereupon is presented to the FCU connector 30 of FIG. 2 to be recorded onto tape devices 17 of FIG. 1.

If a code conversion has not been requested, the output of gate 287 on line 314 shall be at a logic one level to select the multiplexers 306 and 310 away from the FIFO outputs to avoid an extraneous code conversion.

When data is to be read from either the FCU 15 or the MTCU 16, a serial information stream on line 285 is applied to the SDIN inputs of FIFOs 28a and 28b. The SIEN input to FIFO 28b is held enabled. Since the input register of FIFO 28b is initially empty, the IREG output of the FIFO is at a logic one level which disables the SIEN input to FIFO 28a. When the input register of the FIFO 28b is filled with four bits of data, the IREG output of the FIFO transitions to a logic zero level to enable the SIEN input of FIFO 28a. The serial data on line 285 thereafter is loaded into the input register of FIFO 28a. When the input register is filled, the IREG output of FIFO 28a transitions to a logic zero level which is applied to the TTS inputs of FIFOs 28a and 28b to transfer data from the input registers into the FIFO stacks. The data is shifted through the FIFOs under the control of the clock signal on line 227 to appear at the B1-B4 outputs of the FIFOs. At this time, the OREG outputs of the FIFOs transition to a logic zero level to signal the MPDC 10 that a data byte is available. The MPDC 10 thereafter issues a logic zero signal to line 315 to cause the data in the output registers of the FIFOs to be transferred out to accommodate a next data byte.

If the data range of information read from a tape device is specified to be shorter than the block of data on the addressed tape device, gate 304 is used to control the unloading of FIFOs 28a and 28b so that no data transfers to the MPDC occur. More particularly, the output registers of FIFOs 28a and 28b are not transferred to the MPDC 10 until the MPDC 10 issues a logic one signal to line 149.

If a data read with code conversion has been requested, data from the FIFOs 28a, 28b shall be presented to the multiplexers 306 and 310 of code converter 27. The multiplexers are selected to the FIFO outputs in response to a logic zero signal on line 314 leading from the output of gate 287 of FIG. 3c. The A0–D0 outputs of multiplexer 306 are presented to the A1–A4 address inputs of tri-state RAMs 307, 308, 311 and 312. The A0–D0 outputs of multiplexer 310 are presented to the A6–A8, and A12 address inputs of the RAMs.

A first code conversion may be selected by enabling RAMs 307 and 311, the outputs of which are applied through lines 389-296 to the tri-state drivers 39a and 39b of FIG. 3c. If a second code conversion is requested, RAMs 308 and 312 shall be enabled. The outputs of RAM 308 thereupon are applied to lines 289-292, and the outputs of RAM 312 are applied to lines 293-296.

The number of code conversion tables that may be applied to the data received by way of multiplexers 306 and 310 is unlimited. More particularly, the RAMs 307, 308, 311 and 312 may be reloaded with different code conversion tables between data transfers. When the code conversion tables are to be changed, multiplexers 306 and 310 are selected to the outputs of the FIFOs. The MPDC 10 loads 16 bytes of address information into the FIFOs 28a and 28b. On the first load of the FIFOs, address information for locations 0 through 15 is presented. After the first address appears at the B1–B4 outputs of the FIFOs, the multiplexers 306 and 310 are selected to receive data from the MPDC 10. The MPDC thereafter issues a logic one signal to line 316, which is a write enable pulse. If a conversion one control signal appears on line 154, the rightmost four bits of a data byte for location zero of RAM 307 is stored, and the leftmost four bits of the data byte are loaded into the indicated address of RAM 311. The MPDC issues a strobe signal on line 315 to load the output registers of the FIFOs with a new address byte. Line 316 thereafter is strobed to store a next data byte into the addressed location of the RAMs. This process continues until the RAMs 307 and 311 are loaded with a code conversion one table. Thereafter, FIFOs 28a and 28b are loaded with consecutive addresses of RAMs 308 and 312, and line 153 transitions to a logic one level to enable the RAMs. Line 154 however transitions to a logic one level to disable RAMs 307 and 311. The MPDC thereafter applies repetitive sequences of strobes to lines 315 and 316 to store data into RAM locations specified by the FIFO address bytes.

Exemplary of the code conversion tables is that of Table 1.

TABLE 1

| IBM EBCDIC CODE CONVERSION ||||||||
|---|---|---|---|---|---|---|---|
| ADR | CONTENTS | ADR | CONTENTS | ADR | CONTENTS | ADR | CONTENTS |
| 000 | 00100000 | 025 | 00011001 | 050 | 00010111 | 075 | 00101110 |
| 001 | 00000001 | 026 | 10010101 | 051 | 10101110 | 076 | 00111100 |
| 002 | 10000000 | 027 | 10010001 | 052 | 10101111 | 077 | 00101000 |
| 003 | 10000001 | 028 | 10011000 | 053 | 10110000 | 078 | 00101011 |
| 004 | 10000010 | 029 | 10011001 | 054 | 10110001 | 079 | 01111100 |
| 005 | 10000011 | 030 | 10011010 | 055 | 10110010 | 080 | 00100110 |
| 006 | 10000100 | 031 | 10011011 | 056 | 10110011 | 081 | 11000011 |
| 007 | 01111111 | 032 | 00100000 | 057 | 10110100 | 082 | 11000100 |
| 008 | 10000101 | 033 | 10011100 | 058 | 10110101 | 083 | 11000101 |
| 009 | 10010000 | 034 | 10011101 | 059 | 10110110 | 084 | 11000110 |
| 010 | 10000110 | 035 | 10011110 | 060 | 10110111 | 085 | 11000111 |
| 011 | 00001011 | 036 | 10011111 | 061 | 00010110 | 086 | 11001000 |
| 012 | 10000111 | 037 | 10100001 | 062 | 10111000 | 087 | 11001001 |
| 013 | 10001000 | 038 | 10100010 | 063 | 10111001 | 088 | 11001010 |
| 014 | 10001001 | 039 | 10100011 | 064 | 00100000 | 089 | 11001100 |
| 015 | 10001010 | 040 | 10100100 | 065 | 10111010 | 090 | 00100001 |
| 016 | 10001011 | 041 | 10100101 | 066 | 10111011 | 091 | 00100100 |
| 017 | 00000010 | 042 | 10100110 | 067 | 10111100 | 092 | 00101010 |
| 018 | 10001100 | 043 | 10100111 | 068 | 10111101 | 093 | 00101001 |
| 019 | 00000011 | 044 | 10101000 | 069 | 10111110 | 094 | 00111011 |
| 020 | 10001101 | 045 | 10101001 | 070 | 10111111 | 095 | 00011101 |
| 021 | 10001110 | 046 | 10101010 | 071 | 11000000 | 096 | 00101101 |
| 022 | 10001111 | 047 | 10101011 | 072 | 11000001 | 097 | 00101111 |
| 023 | 10010010 | 048 | 10101100 | 073 | 11000010 | 098 | 11001101 |
| 024 | 10010100 | 049 | 10101101 | 074 | 00010010 | 099 | 11001110 |
| 100 | 11001111 | 125 | 00100111 | 150 | 01101111 | 175 | 01011110 |
| 101 | 11010000 | 126 | 00111101 | 151 | 01110000 | 176 | 00000001 |
| 102 | 11010001 | 127 | 00100010 | 152 | 01110001 | 177 | 01100000 |
| 103 | 11010010 | 128 | 11100100 | 153 | 01110010 | 178 | 00000011 |
| 104 | 11010011 | 129 | 01100001 | 154 | 11100111 | 179 | 00000100 |
| 105 | 11010100 | 130 | 01100010 | 155 | 01111101 | 180 | 00000101 |
| 106 | 11010101 | 131 | 01100011 | 156 | 00010101 | 181 | 00000110 |
| 107 | 00101100 | 132 | 01100100 | 157 | 00001110 | 182 | 00000111 |
| 108 | 00100101 | 133 | 01100101 | 158 | 00000010 | 183 | 00001000 |
| 109 | 01011111 | 134 | 01100110 | 159 | 00010000 | 184 | 00001001 |
| 110 | 00111110 | 135 | 01100111 | 160 | 00001100 | 185 | 00001010 |
| 111 | 00111111 | 136 | 01101000 | 161 | 01111110 | 186 | 11101001 |
| 112 | 11010110 | 137 | 01101001 | 162 | 01110011 | 187 | 00011000 |
| 113 | 11010111 | 138 | 11100101 | 163 | 01110100 | 188 | 00011001 |
| 114 | 11011000 | 139 | 01111011 | 164 | 01110101 | 189 | 01011101 |
| 115 | 11011001 | 140 | 00011110 | 165 | 01110110 | 190 | 00010100 |
| 116 | 11011010 | 141 | 00001101 | 166 | 01110111 | 191 | 00011100 |
| 117 | 11011101 | 142 | 00001011 | 167 | 01111000 | 192 | 01111011 |
| 118 | 11011110 | 143 | 00011111 | 168 | 01111001 | 193 | 01000001 |
| 119 | 11100000 | 144 | 11100110 | 169 | 01111010 | 194 | 01000010 |

TABLE 1-continued

IBM EBCDIC CODE CONVERSION

| ADR | CONTENTS | ADR | CONTENTS | ADR | CONTENTS | ADR | CONTENTS |
|---|---|---|---|---|---|---|---|
| 120 | 11100010 | 145 | 01101010 | 170 | 11101000 | 195 | 01000011 |
| 121 | 11100011 | 146 | 01101011 | 171 | 00011011 | 196 | 01000100 |
| 122 | 00111010 | 147 | 01101100 | 172 | 00011010 | 197 | 01000101 |
| 123 | 00100011 | 148 | 01101101 | 173 | 01011011 | 198 | 01000110 |
| 124 | 01000000 | 149 | 01101110 | 174 | 00001111 | 199 | 01000111 |
| 200 | 01001000 | 225 | 11100001 | 250 | 11111001 | | |
| 201 | 01001001 | 226 | 01010011 | 251 | 11111010 | | |
| 202 | 11101010 | 227 | 01010100 | 252 | 11111011 | | |
| 203 | 11001011 | 228 | 01010101 | 253 | 11111100 | | |
| 204 | 11101011 | 229 | 01010110 | 254 | 11111101 | | |
| 205 | 11101100 | 230 | 01010111 | 255 | 00000000 | | |
| 206 | 11111111 | 231 | 01011000 | | | | |
| 207 | 11101101 | 232 | 01011001 | | | | |
| 208 | 11101110 | 233 | 01011010 | | | | |
| 209 | 01001010 | 234 | 11110100 | | | | |
| 210 | 01001011 | 235 | 11110101 | | | | |
| 211 | 01001100 | 236 | 01000000 | | | | |
| 212 | 01001101 | 237 | 11110110 | | | | |
| 213 | 01001110 | 238 | 11110111 | | | | |
| 214 | 01001111 | 239 | 11111000 | | | | |
| 215 | 01010000 | 240 | 00110000 | | | | |
| 216 | 01010001 | 241 | 00110001 | | | | |
| 217 | 01010010 | 242 | 00110010 | | | | |
| 218 | 11101111 | 243 | 00110011 | | | | |
| 219 | 11011011 | 244 | 00110100 | | | | |
| 220 | 11110000 | 245 | 00110101 | | | | |
| 221 | 11110001 | 246 | 00110110 | | | | |
| 222 | 11110010 | 247 | 00110111 | | | | |
| 223 | 11110011 | 248 | 00111000 | | | | |
| 224 | 01011100 | 249 | 00111001 | | | | |

If the IBM EBCDIC code conversion table were to be used as code conversion one, the leftmost four bits of each byte would be loaded into the indicated address of RAM 311. The rightmost four bits would be loaded into RAM 307. If the table were to be used as code conversion two, however, the leftmost bits would be added to RAM 312 and the rightmost bits to RAM 308.

A code conversion table is comprised of 256 locations, each of which is eight bits wide and split into four bit halves. If a code conversion table of shorter length is used, all unused locations are filled with logic 1 bits. The addresses of FIG. 4 are listed in decimal notation, and have to be converted to hexidecimal for use in the logic system of FIGS. 3a–3d.

FIG. 4

Figure 4:
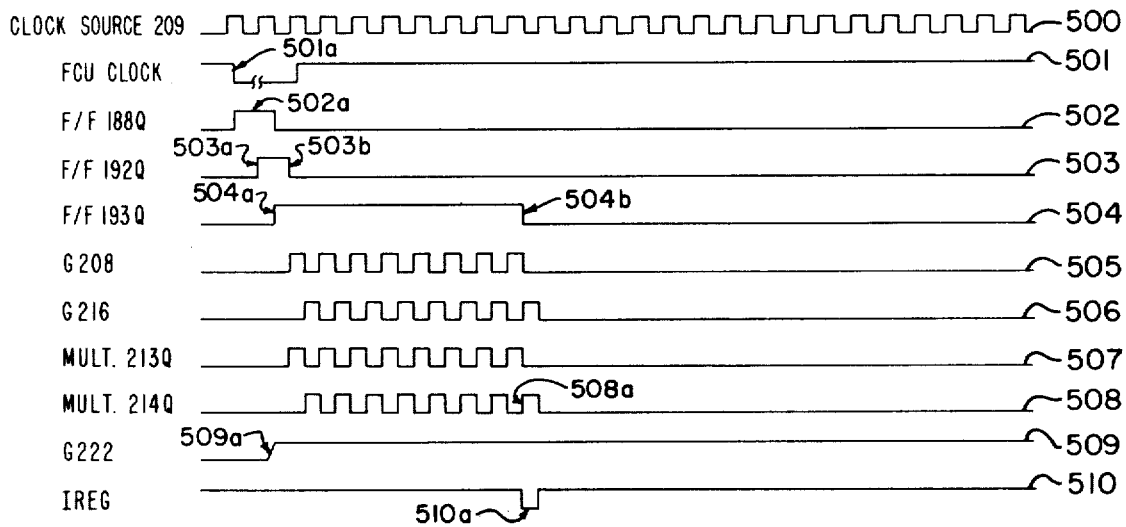
FIG. 4 is a timing diagram of the operation of the invention as illustrated in FIG. 3b during a 1×1 data read.

FIG. 4 illustrates in a time graph form the operation of the logic system of FIGS. 3a–3d during a 1×1 data read from the FCU 15.

Waveform 500 illustrates the 8 MHz clock signal generated by clock source 209 of FIG. 3b, and a waveform 501 illustrates a clock signal issued by the FCU 15 to line 186 of FIG. 3b. A waveform 502 illustrates the Q output of flip-flop 188 of FIG. 3b, a waveform 503 illustrates the Q output of flip-flop 192, and a waveform 504 illustrates the Q output of flip-flop 193 of FIG. 3b. A waveform 505 illustrates the clock signal at the output of gate 208 of FIG. 3b, and a waveform 506 illustrates the clock signal at the output of gate 216 of FIG. 3b. A waveform 507 illustrates the Q output of multiplexer 213, a waveform 508 illustrates the Q output of multiplexer 214, and a waveform 509 illustrates the output of gate 222 of FIG. 3b. A waveform 510 illustrates the IREG output of FIFO 28a of FIG. 3b.

In order to initiate a 1×1 read from the FCU 15, the FCU 15 causes a positive-to-negative transition to occur on line 186 of FIG. 3b as illustrated at 501a of waveform 501. The flip-flop 188 of FIG. 3b thereby is toggled to provide a clock pulse as illustrated by pulse 502a of waveform 502.

Concurrent with a next negative-to-positive transition in the clock signal of waveform 500, the Q output of flip-flop 192 transitions to a logic one level as illustrated at 503a of waveform 503. During the time that waveform 504 is at a logic zero level, the PISO registers 45 and 48 are in a load configuration. Thus, when the leading edge of pulse 503 a occurs, the register 48 is loaded with a first data byte from the FCU 15. Upon the occurrence of the trailing edge of pulse 502a, the Q output of flip-flop 193 transitions to a logic one level as illustrated at 504a of waveform 504. The register 48 thereby is placed in a shifting configuration under the control of the clock signal on line 279 as illustrated by waveform 508. When the B6 output of command register 24 of FIG. 3a transitions to a logic zero on line 228, the output of gate 222 transitions to a logic one level as illustrated at 509a to enable gate 50 of FIG. 3c. A serial data stream from the registers 45 and 48 thereupon may be routed through the gate 50 to the SDIN inputs of FIFOs 28a and 28b of FIG. 3d. The waveform 509 remains at a logic one level so long as either line 225 or line 228 remain at a logic zero level.

After the Q output of flip-flop 188 transitions to a logic zero level as indicated by the trailing edge of pulse 502a, the Q output of flip-flop 192 transitions to a logic zero level upon the next occurrence of a rising edge in the clock signal of waveform 500. Concurrent therewith the output of gate 199 transitions to a logic one level to enable gate 208. The 8 MHz clock signal of waveform 500 thereupon appears at the output of gate 208 of FIG. 3b as illustrated by waveform 505.

Since a 1×1 data read from the FCU 15 has been requested, the multiplexer 213 is selected to its A4 input and the multiplexer 214 is selected to one of its A1–A3 inputs. Since the tape adapter is in a 1×1 read mode, the B2 and B7 outputs of command register 24 remain at a logic zero. The lines 225 and 226 therefore are at a logic zero level, and the outputs of gates 223, 220 and 217 are at a logic zero. The multiplexer 213 thereby is enabled to route the clock signal of waveform 505 to its Q output as illustrated by waveform 507. In addition, the multiplexer 214 is enabled.

The 8 MHz clock signal illustrated by waveform 506 and supplied by gate 216 is delayed one clock pulse width after the output of gate 208 first transitions to a logic one level. The delay occurs as a result of the negation of the waveform 505 being applied to the clock input of flip-flop 204. Since multiplexer 214 is enabled, the 8 MHz clock signal of waveform 506 appears at the Q output of the multiplexer as illustrated by waveform 508. The leading edge of each pulse of waveform 507 causes a data bit to be loaded into one of FIFOs 28a and 28b, and the leading edge of each pulse of waveform 508 causes a data bit to be issued from the CO output of register 48. Upon the occurrence of the leading edge of the eighth logic one pulse at the Q output of multiplexer 214 as illustrated at 508a of waveform 408, the B7 output of shift register 202 of FIG. 3b transitions to a logic one level to effect the resetting of flip-flop 193 as illustrated at 504b. In addition, the IREG output of FIFO 28a of FIG. 3b transitions to a logic zero for one clock pulse width as illustrated by the logic zero pulse 510a of waveform 510.

If a 1×1 write with code conversion were commanded by the MPDC 10, the timing diagrams of FIG. 4 shall remain unchanged with one exception. The flip-flop 188 shall be triggered in response to a strobe issued by the MPDC 10 to line 185 of FIG. 3b to produce the waveform 502. If a 1×1 read from the MTCU 16 were commanded, the timing diagrams of FIG. 4 remain unchanged except for three differences. First, sixteen clock pulses rather then eight clock pulses shall appear in waveform 508 before waveform 504 transitions to a logic zero level. Second, during the period that the waveform 504 is at a logic one level, two logic zero pulses shall appear in waveform 510. More particularly, a logic zero pulse shall appear at the leading edge of each eighth clock pulse of waveform 508. Third, the flip-flop 188 shall be triggered in response to the output of gate 245 of FIG. 3c.

FIG. 5

Figure 5:
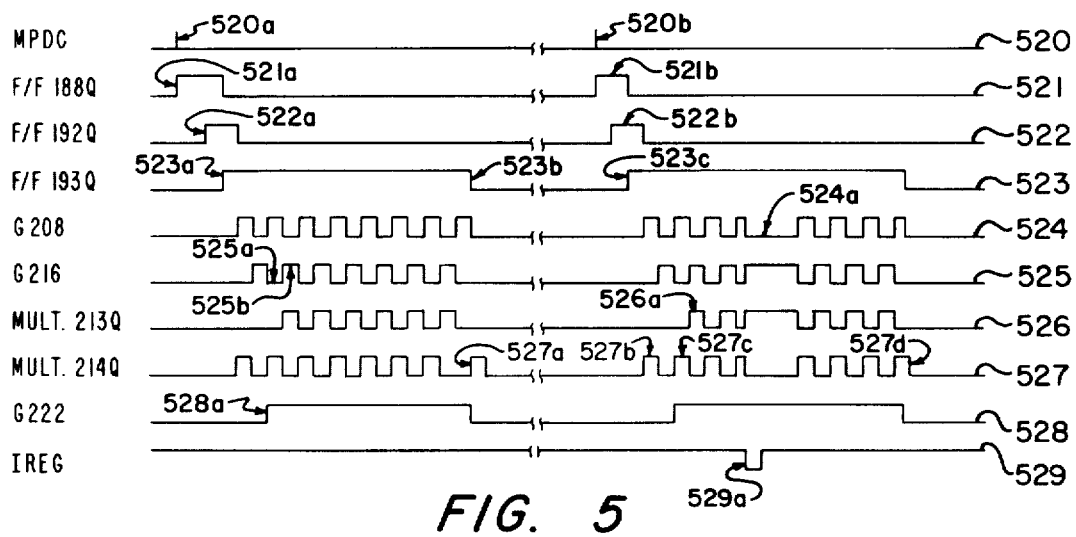
FIG. 5 is a timing diagram of the operation of the invention of FIG. 3b during a 4×3 data write.

FIG. 5 illustrates in timing diagram form the operation of the tape adapter 14 of FIGS. 3a-3d during a 4×3 write operation.

Waveform 520 illustrates the output of the MPDC 10 to line 185 leading to gate 184, and a waveform 521 illustrates the Q output of flip-flop 188 of FIG. 3b. A waveform 522 illustrates the Q output of flip-flop 192 and a waveform 523 illustrates the Q output of flip-flop 193. A waveform 524 illustrates the output of gate 208, a waveform 525 illustrates the output of gate 216, and a waveform 526 illustrates the Q output of multiplexer 213 of FIG. 3b. A waveform 527 illustrates the Q output of multiplexer 214, a waveform 528 illustrates the output of gate 222 of FIG. 3b, and a waveform 529 illustrates the IREG output of FIFO 28a of FIG. 3d.

In response to a logic zero strobe 520a issued by the MPDC 10 to line 185 of FIG. 3b, the Q output of flip-flop 188 transitions to a logic one level as illustrated by the leading edge of pulse 521a of waveform 521. Upon the occurrence of a next rising edge in the clock signal of waveform 500, the Q output of flip-flop 192 transitions to a logic one level as illustrated by the leading edge of pulse 522a of waveform 522.

Since the flip-flop 188 is in a toggle mode, the Q output of the flip-flop transitions to a logic zero level at the trailing edge of pulse 521a of waveform 521. Concurrently therewith, the Q output of flip-flop 193 transitions to a logic one level at 523a of waveform 523. The gate 208 thereby is enabled.

The Q output of flip-flop 192 transitions to a logic zero level at the trailing edge of pulse 522a upon the next occurrence of a negative-to-positive transition in the clock signal of waveform 500. In addition, the 8 MHz clock signal of waveform 500 appears at the output of gate 208 as illustrated by waveform 524. Further, the 8 MHz clock signal of waveform 525 appears at the output of gate 216 after a delay of one clock pulse width as before described.

In response to a logic zero signal at the B6 output of command register 24, line 228 transitions to a logic zero level. Gate 222 thereupon transitions to a logic one level as indicated at 528a of waveform 528.

During a 4×3 write, the multiplexers 213 and 214 are selected to their A4 inputs. Further, the B2 and B7 outputs of command register 24 are at a logic one level as are the lines 225 and 226. The outputs of gates 217 and 218 thus are at a logic zero level to enable the multiplexer 214. The clock signal of waveform 424 thereby is provided at the Q output of multiplexer 214 as illustrated by waveform 527.

As before described, the leading two bit positions of each data byte are forced to a logic zero level during a 4×3 data pack. To effect this result, the multiplexer 213 is not enabled until after the occurrence of two clock pulses in waveform 527. More particularly, two positive going clock pulses in waveform 524 must occur before the B1 output of shift register 203 transitions to a logic one level to enable multiplexer 213. The multiplexer is enabled, however, during the logic zero time period between pulses of waveform 525 as illustrated at 525a. A first clock pulse does not appear at the Q output of multiplexer 213, therefore, until the occurrence of pulse 525b as illustrated by waveform 526. The register 48 of FIG. 3c thereby is shifted twice before the FIFOs of FIG. 3d are loaded with a data bit.

Upon the occurrence of the negative-going transition at 522b, eight clock pulses of the 8 MHz clock signal of waveform 527 occur to shift a data byte through the register 48 of FIG. 3c. During this time period, the FIFOs of FIG. 3d have been loaded with only six bits of data as indicated by the six clock pulses of waveform 526. Synchronous with the leading edge of the eighth clock pulse 527a, gate 205 transitions to a logic zero level to effect the resetting of flip-flop 193 of FIG. 3b. The waveform 523 thus transitions to a logic zero level as indicated at 523b.

Upon the occurrence of a second strobe 420b on line 185 of FIG. 3b, pulses 521b and 522b are generated as before described for pulses 521a and 522a. The waveform 523 again transitions to a logic one level at 523c in a manner analogous to that at 523a. The gate 208, and multiplexers 213 and 214 are enabled as before described.

The shift register 48 is shifted two positions by the pulses 527 and 527c before a first data bit is loaded into the FIFOs of FIG. 3d in response to pulse 526a. After a second data is loaded into the FIFOs, the input register of FIFO 28a is filled. The IREG output of the FIFO 28a thereupon transitions to a logic zero for one clock pulse width as indicated at 529a of waveform 529. During the transfer of data from the input registers to the FIFO stacks, the clock signals enter a stutter period as indicated at 524a. The pulses of waveform 527 thereafter continue to shift data out of register 48, and the pulses of waveform 526 continue to load data bits into the FIFOs until an eighth pulse 527d occurs after the strobe 520b. The waveform 523 then transitions to a logic zero as before described to terminate the logic system clock signals of waveforms 524-527.

FIG. 6

Figure 6:
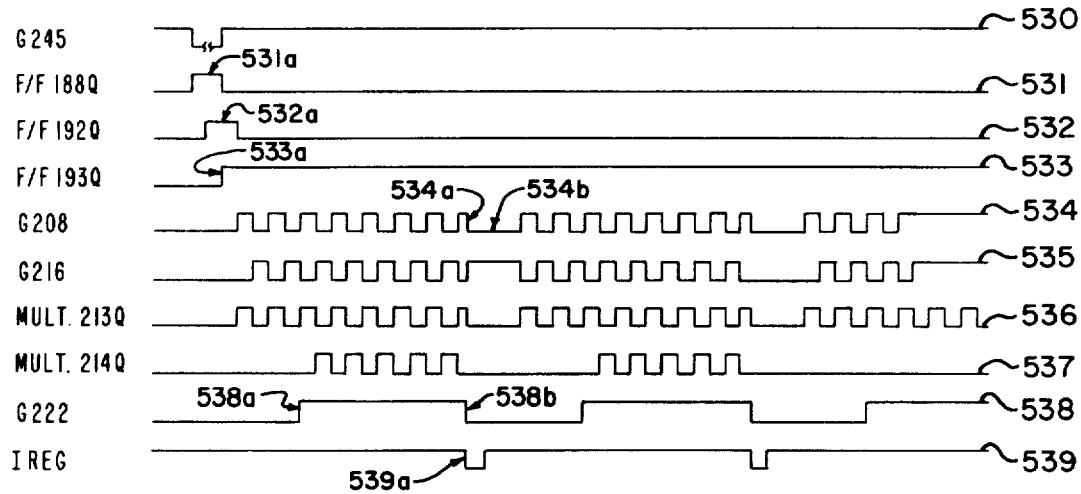
FIG. 6 is a timing diagram of the operation of the invention of FIG. 3b during a 4×3 data read.

FIG. 6 illustrates in timing graph form the operation of the tape adapter 14 logic system of FIGS. 3a-3d during a 4×3 read from the MTCU 16.

A waveform 530 illustrates the output of gate 245 of FIG. 3c, and a waveform 531 illustrates the Q output of flip-flop 188 of FIG. 3b. A waveform 532 illustrates the Q output of flip-flop 192 of FIG. 3b and a waveform 533 illustrates the Q output of flip-flop 193 of FIG. 3b. Waveforms 534-537 respectively illustrate the outputs of gate 208, gate 316, multiplexer 213, and multiplexer 214 of FIG. 3b. A waveform 538 illustrates the output of gate 222 of FIG. 3b, and a waveform 539 illustrates the IREG output of FIFO 28a of FIG. 3d.

Upon the output of gate 425 transitioning to a logic zero level, the flip-flop 188 is toggled to produce a pulse 531a of waveform 531. Upon the occurrence of a next rising edge in the clock signal of waveform 500, the Q output of flip-flop 192 transitions to a logic one level as illustrated by pulse 532a of waveform 532. Concurrent with the trailing edge of pulse 531a, the Q output of flip-flop 193 transitions to a logic one level as illustrated at 533a of waveform 533 to enable gate 199. Upon the occurrence of a next leading edge in the clock signal of waveform 500, the Q output of flip-flop 192 transitions to a logic zero level and the clock signal of waveform 500 appears at the output of gate 208 as illustrated by waveform 534.

During a 4×3 read, the multiplexer 213 is selected to one of its A1-A3 inputs and multiplexer 214 is selected to its A1-A3 inputs. Line 225 is at a logic one level and line 226 is at a logic zero level. Gates 223 and 220 therefore are disabled to enable multiplexer 213. The clock signal of waveform 534 thus appears at the Q output of multiplexer 213 as illustrated by waveform 536.

Gate 217 remains enabled to gate the output of inverter 221 through gate 218 to the enable input of multiplexer 214. After three clock pulses occur in the clock signal of waveform 534, the B2 output of shift register 202 transisitions to a logic one level to disable gate 218 and enable multiplexer 214. The clock signal of waveform 535 thereafter appears at the Q output of multiplexer 214 as illustrated by waveform 537.

Upon the occurrence of the leading edge of a third clock pulse at the Q output of multiplexer 213 of FIG. 3b, the B2 output of shift register 203 transitions to a logic one level to cause the output of gate 222 to transition to a logic one level as illustrated at 538a of waveform 538. Prior to this time, the FIFOs of FIG. 3d receive two clock pulses of waveform 536 to load two logic zero data bits. Following the positive-going transition 538a, a data bit is shifted out of registers 45 and 48 of FIG. 3c in response to a clock pulse of waveform 538, and loaded into the FIFOs 28a and 28b in response to a clock pulse of waveform 536. After six clock pulses have occurred in waveform 537, the input register of FIFO 28a indicates that eight bits have been loaded into the FIFOs by issuing an IREG logic zero pulse 599a. In addition, the B7 output of register 202 transitions to a logic one level to enable gate 205, thereby effecting the resetting of flip-flop 193 as indicated at 534a.

Since gate 217 is enabled, multiplexer 211 is selected to the A2 input. When the pulse 599a appears on line 210, the Q output of multiplexer 211 transitions to a logic zero to reset the shift register 203 of FIG. 3b. The B2 output of the shift register thereupon transitions to a logic zero level as indicated at 538b.

During the time period that the data is being transferred from the input registers of the FIFOs to the FIFO stacks, the clocks stutter as indicated at 534b. After the clocks have settled, the above-described cycle is repeated to transfer 16 bits of data from the MTCU 16 to the MPDC 10.

FIG. 7

Figure 7:
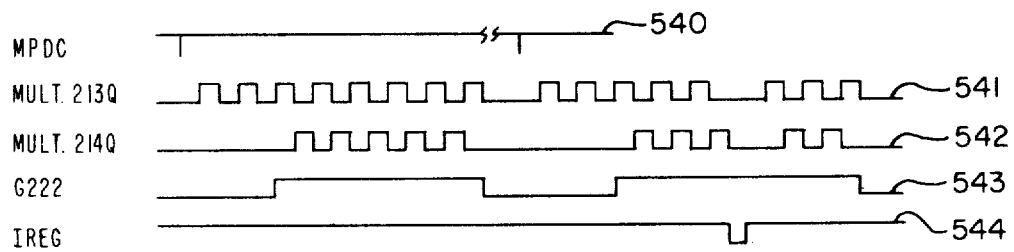
FIG. 7 is a timing diagram of the operation of the invention of FIG. 3b during an 8×5 data write.

FIG. 7 illustrates in timing diagram form the operation of the logic system of FIGS. 3a-3d during an 8 ×5 write operation.

The tape device adapter 14 as illustrated in FIGS. 3a-3d may with minor modifications to the logic control system accommodate further packing and depacking operations. Referring to FIG. 3b, the input to inverter 219 may be disconnected from the B1 output of register 203 and connected to the B2 output. Further, the input to the inverter 221 may be disconnected from the B2 output of the register 203 and connected to the B3 output. The roles of the multiplexers 213 and 214 thereby may be exchanged to provide an 8×5 packdepack capability.

The operation of the logic system of FIGS. 3a-3d as modified remains as illustrated in FIGS. 5 and 6 for the before-described 4×3 operations, except for the logic devices for which timing diagrams are illustrated in FIG. 7. Referring to FIG. 7, a waveform 540 illustrates the output of the MPDC 10 to line 185 leading to gate 184, and a waveform 541 illustrates the Q output of multiplexer 213 of FIG. 3b. A waveform 542 illustrates the Q output of multiplexer 214, and a waveform 543 illustrates the output of gate 222 of FIG. 3b. A waveform 544 illustrates the IREG output of FIFO 28a of FIG. 3d.

In the operation of the logic system of FIGS. 3a-3d during an 8×5 read or write operation with or without code conversion, three leading logic zero bits occur in a data byte before the output of gate 222 transitions to a logic one level during a read operation, and one clock output of multiplexer 214 is deleted for each byte transferred during a write operation.

The result of a packing or depacking of information transferred between the MPDC 10 and a tape device may better be understood by reference to Table 2.

TABLE 2

| 8 × 5 PACK - DEPACK | | | | | | | | | | | | | | | | |
|---|---|---|---|---|---|---|---|---|---|---|---|---|---|---|---|---|
| MPDC | | | | | | | | | EIGHT TRACK TAPE DEVICE | | | | | | | |
| BYTE | BIT | | | | | | | | FRAME | BIT | | | | | | |
| NUMBER | 1 | 2 | 3 | 4 | 5 | 6 | 7 | 8 | NUMBER | 1 | 2 | 3 | 4 | 5 | 6 | 7 | 8 |
| 1. | 0 | 0 | 0 | 1 | 1 | 1 | 1 | 1 | 1. | 1 | 1 | 1 | 1 | 1 | 2 | 2 | 2 |

TABLE 2-continued

| | 8 × 5 PACK - DEPACK | | | | | | | | | | | | | | | | |
|---|---|---|---|---|---|---|---|---|---|---|---|---|---|---|---|---|---|
| | MPDC | | | | | | | | EIGHT TRACK TAPE DEVICE | | | | | | | | |
| BYTE | BIT | | | | | | | | FRAME | BIT | | | | | | | |
| NUMBER | 1 | 2 | 3 | 4 | 5 | 6 | 7 | 8 | NUMBER | 1 | 2 | 3 | 4 | 5 | 6 | 7 | 8 |
| 2. | 0 | 0 | 0 | 2 | 2 | 2 | 2 | 2 | 2. | 2 | 2 | 3 | 3 | 3 | 3 | 3 | 4 |
| 3. | 0 | 0 | 0 | 3 | 3 | 3 | 3 | 3 | 3. | 4 | 4 | 4 | 4 | 5 | 5 | 5 | 5 |
| 4. | 0 | 0 | 0 | 4 | 4 | 4 | 4 | 4 | 4. | 5 | 6 | 6 | 6 | 6 | 6 | 7 | 7 |
| 5. | 0 | 0 | 0 | 5 | 5 | 5 | 5 | 5 | 5. | 7 | 7 | 7 | 8 | 8 | 8 | 8 | 8 |
| 6. | 0 | 0 | 0 | 6 | 6 | 6 | 6 | 6 | | | | | | | | | |
| 7. | 0 | 0 | 0 | 7 | 7 | 7 | 7 | 7 | | | | | | | | | |
| 8. | 0 | 0 | 0 | 8 | 8 | 8 | 8 | 8 | | | | | | | | | |

When data from the MPDC 10 is to be written on an eight track tape device, eight bytes of data are packed into five data bytes as shown in Table 2. If a depacking is to occur during a read operation, each five bytes of data read from the eight track tape device are depacked into eight bytes of data wherein each byte includes three leading logic zero data bits.

FIG. 8

Figure 8:
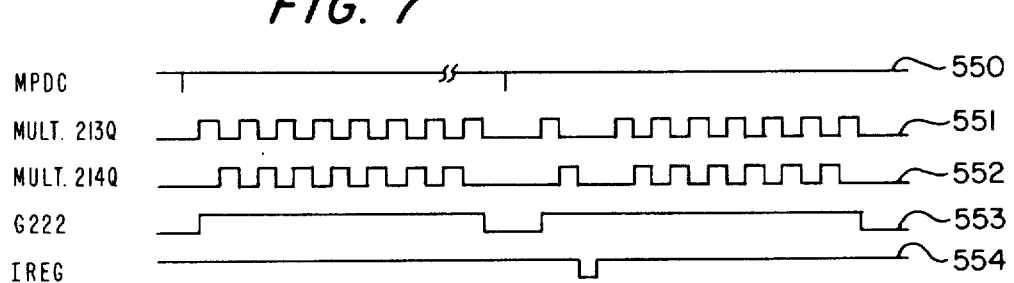
FIG. 8 is a timing diagram of the operation of the invention of FIG. 3b during an 8×7 data write.

FIG. 8 illustrates in timing diagram form the operation of the logic system of FIGS. 3a-3d during and 8×7 write operation.

Referring to FIG. 3b, the input to inverter 219 may be disconnected from the B1 output of register 203 and connected to the B0 output. In addition, the input to inverter 221 may be disconnected from the B2 output of the register 203 and connected to the B1 output. The roles of the multiplexers 213 and 214 thereby are exchanged to provide an 8×7 pack-depack capability.

The operation of the logic system of FIGS. 3a-3d as modified occurs as illustrated in FIGS. 5 and 6 except for the logic devices for which timing diagrams are illustrated in FIG. 7.

Referring to FIG. 8, a waveform 550 illustrates the output of the MPDC 10 to line 185 leading to gate 184, and a waveform 551 illustrates the Q output of multiplexer 213. A waveform 552 illustrates the Q output of multiplexer 214, and the waveform 553 illustrates the output of gate 222. A waveform 554 illustrates the IREG output of FIFO 28a of FIG. 3d.

In the operation of the logic system of FIGS. 3a-3d as modified during an 8×7 read or write operation, only one leading logic zero data bit is added to each data byte during a read operation, and only one leading logic zero data bit is deleted from a data byte received from the MPDC 10 during a write operation.

Referring to Table 3, it is seen that during a write operation, eight data bytes received from the MPDC 10 are packed into seven data bytes for writing on an eight track tape device. During a read operation, however, each seven data bytes received from the tape device are depacked into eight data bytes for transfer to the MPDC 10.

TABLE 3

| | 8 × 7 PACK - DEPACK | | | | | | | | | | | | | | | | |
|---|---|---|---|---|---|---|---|---|---|---|---|---|---|---|---|---|---|
| | MPDC | | | | | | | | EIGHT TRACK TAPE DEVICE | | | | | | | | |
| BYTE | BIT | | | | | | | | FRAME | BIT | | | | | | | |
| NUMBER | 1 | 2 | 3 | 4 | 5 | 6 | 7 | 8 | NUMBER | 1 | 2 | 3 | 4 | 5 | 6 | 7 | 8 |
| 1. | 0 | 1 | 1 | 1 | 1 | 1 | 1 | 1 | 1. | 1 | 1 | 1 | 1 | 1 | 1 | 1 | 2 |
| 2. | 0 | 2 | 2 | 2 | 2 | 2 | 2 | 2 | 2. | 2 | 2 | 2 | 2 | 2 | 2 | 3 | 3 |
| 3. | 0 | 3 | 3 | 3 | 3 | 3 | 3 | 3 | 3. | 3 | 3 | 3 | 3 | 4 | 4 | 4 | 4 |
| 4. | 0 | 4 | 4 | 4 | 4 | 4 | 4 | 4 | 4. | 4 | 4 | 4 | 5 | 5 | 5 | 5 | 5 |
| 5. | 0 | 5 | 5 | 5 | 5 | 5 | 5 | 5 | 5. | 5 | 5 | 5 | 6 | 6 | 6 | 6 | 6 |
| 6. | 0 | 6 | 6 | 6 | 6 | 6 | 6 | 6 | 6. | 6 | 6 | 7 | 7 | 7 | 7 | 7 | 7 |
| 7. | 0 | 7 | 7 | 7 | 7 | 7 | 7 | 7 | 7. | 7 | 8 | 8 | 8 | 8 | 8 | 8 | 8 |
| 8. | 0 | 8 | 8 | 8 | 8 | 8 | 8 | 8 | | | | | | | | | |

FIG. 9

Figure 9:
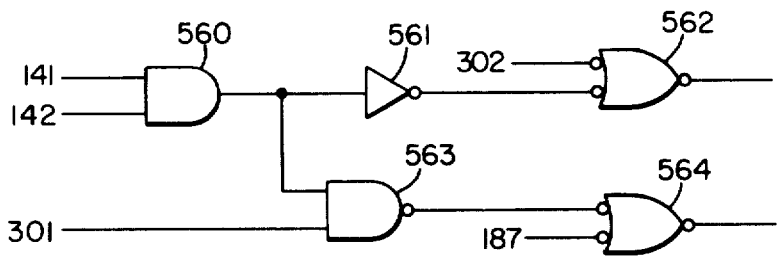
FIG. 9 is a detailed electrical schematic diagram of a hardware logic modification to the invention of FIG. 3b for an 8×9 data read or data write.

FIG. 9 illustrates in logic diagram form modifications which may be made to the logic system of FIGS. 3a-3d to provide an 8×9 pack-depack capability.

Referring to FIG. 9, control lines 141 and 142 leading from the B6 and B7 outputs, respectively, of device command register 23 of FIG. 3a are applied to inputs of AND gate 560. The output of gate 560 is applied through an inverter 561 to one input of an OR gate 562, a second input of which is connected to line 302 of FIG. 3d. The output of gate 562 is connected to the input of gate 300 of FIG. 3d which previously was connected to line 302.

The output of gate 560 also is applied to one input of a NAND gate 563, a second input of which is connected to line 301 of FIG. 3d. The output of gate 563 is applied to one input of an OR gate 564, a second input of which is connected to control line 187. The output of gate 564 is applied to the input of gate 184 of FIG. 3b previously connected to control line 187.

In operation, the output of gate 560 transitions to a logic one level when both lines 141 and 142 are at a logic one level. The output of inverter 561, therefore, acts to disable gate 562. Further, the output of gate 563 is at a logic zero level when both the output of gate 560 nd line 301 are at a logic one level. The output of gate 564 thus transitions to a logic zero level.

In conjunction with the above-described logic changes, the input to inverter 219 of FIG. 3b is disconnected from the B1 output of register 203 and connected to the B6 output of the register. In addition, the input to the inverter 221 is disconnected from the B2 output of register 203 and connected to the B7 output. The logic modifications to the logic control system of FIGS. 3a-3d thereby are completed to accommodate 8×9 pack-depack operations.

FIGURE 10

Figure 10:
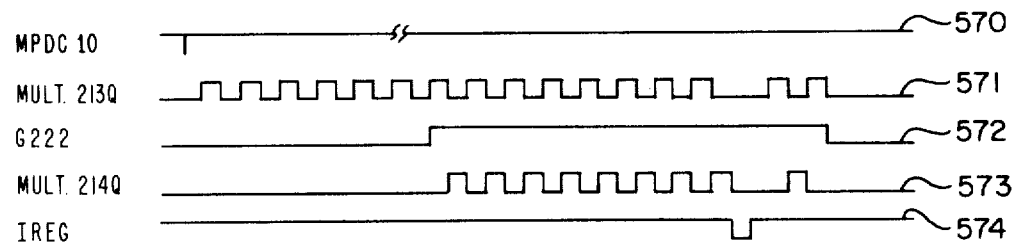
FIG. 10 is a timing diagram of the operation of the invention of FIG. 3b during an 8×9 data write.

FIG. 10 illustrates in timing diagram form the operation of the logic system of FIGS. 3a-3d during an 8×9 write operation.

A waveform 570 illustrates the output of the MPDC 10 to line 185 leading to gate 184, and a waveform 571 illustrates the Q output of multiplexer 213 of FIG. 3b. A waveform 572 illustrates the output of gate 222 of FIG. 3b, and a waveform 573 illustrates the Q output of multiplexer 214. The waveform 574 illustrates the IREG output of FIFO 28a of FIG. 3d.

The operation of the logic system of FIGS. 3a-3d occurs as before described for a 4×3 write operation, except that the timing diagram of FIG. 5 is changed to the extent illustrated in FIG. 10. Further, the device command register 23 of FIG. 3a is loaded in response to logic one signals on line 100 during a time that the A6 and A7 inputs of the A0-A7 inputs to the register on data cable 22 are at a logic one level. In response thereto, the B6 and B7 outputs of the device command register 23 transition to a logic one level. The multiplexer registers 26a and 26b of FIG. 3c are loaded with a first data byte in response to a logic control signal on line 253, and multiplexer registers 25a and 25b are loaded with a second data byte in response to logic control signals on control line 247. In addition, the firmware control system of MPDC 10 generates logic control signals on line 301 to initiate the parallel loading of data into the FIFO registers 28a and 28b of FIG. 3d.

The 8×9 pack-depack operations may be better understood by reference to Table 4. Sixteen bytes of data received from the MPDC 10 are packed into nine bytes of data in an 8×9 write operation. Data formatted as nine bit ASCII data thereby is reformatted for writing on an eight track magnetic tape device. If data is to be read from a tape device, nine 8-bit data bytes from the tape device are depacked into eight 9-bit ASCII characters for transfer to the MPDC 10.

TABLE 4

8 × 9 PACK - DEPACK

| BYTE NUMBER | MPDC BIT | | | | | | | | FRAME NUMBER (EIGHT TRACK TAPE) | BIT | | | | | | | |
|---|---|---|---|---|---|---|---|---|---|---|---|---|---|---|---|---|---|
| | 1 | 2 | 3 | 4 | 5 | 6 | 7 | 8 | | 1 | 2 | 3 | 4 | 5 | 6 | 7 | 8 |
| 1. | X | X | X | X | X | X | X | 1 | 1. | 1 | 1 | 1 | 1 | 1 | 1 | 1 | 1 |
| 2. | 1 | 1 | X | X | X | X | X | 1 | 2. | 1 | 2 | 2 | 2 | 2 | 2 | 2 | 2 |
| 3. | X | X | 2 | 2 | X | X | X | 2 | 3. | 2 | 2 | 3 | 3 | 3 | 3 | 3 | 3 |
| 4. | 2 | X | X | 3 | 3 | X | X | 2 | 4. | 3 | 3 | 3 | 4 | 4 | 4 | 4 | 4 |
| 5. | X | X | 3 | X | X | 4 | X | 3 | 5. | 4 | 4 | 4 | 4 | 5 | 5 | 5 | 5 |
| 6. | 3 | X | X | 4 | X | X | 5 | 3 | 6. | 5 | 5 | 5 | 5 | 5 | 6 | 6 | 6 |
| 7. | X | 4 | X | X | 5 | X | X | 4 | 7. | 6 | 6 | 6 | 6 | 6 | 6 | 7 | 7 |
| 8. | 4 | X | 5 | X | X | 6 | X | 4 | 8. | 7 | 7 | 7 | 7 | 7 | 7 | 7 | 8 |
| 9. | X | 5 | X | X | 6 | X | 7 | 5 | 9. | 8 | 8 | 8 | 8 | 8 | 8 | 8 | 8 |
| 10. | 5 | X | 6 | X | X | 7 | X | 5 | | | | | | | | | |
| 11. | X | 6 | X | 7 | X | X | 8 | 6 | | | | | | | | | |
| 12. | 6 | X | X | 7 | X | 8 | X | 6 | | | | | | | | | |
| 13. | X | X | 7 | X | 8 | X | X | 7 | | | | | | | | | |
| 14. | 7 | 7 | X | 8 | X | X | X | 7 | | | | | | | | | |
| 15. | X | X | X | X | X | X | X | 8 | | | | | | | | | |
| 16. | 8 | 8 | 8 | 8 | 8 | 8 | 8 | 8 | | | | | | | | | |

In accordance with the invention, a logic timing system for a tape device adapter accommodating the transfer of information between plural mass storage devices and a medium performance device controller (MPDC) in a data processing system is provided, wherein the mass storage devices and the MPDC each may exhibit different processor codes, densities, data formats, recording medium tracks, logic conventions and data transfer rates.

More particularly, the logic timing system provides plural timing signals having dynamically selectable phase relationships for accommodating the selection of any of a plurality of pack-depack modes with or without code conversion during either a data read or a data write. The logic timing system further compensates for information transfer delays by entering into a burst mode in response to either MPDC or mass storage device data requests, thereby maintaining a commercially acceptable transfer rate.

In another aspect of the invention, the logic timing system includes logic circuitry responsive to the MPDC and each of plural mass storage devices for selectively entering into a clear, wait, normal or burst mode to synchronize the transfer of information through the tape device adapter to maintain commercially acceptable data transfer rates without incurring data losses or residual data errors.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A logic timing system for providing plural timing frequencies exhibiting selectably variable phase relationships to accommodate the transfer of binary information through a tape device adapter electrically interfacing between plural magnetic tape device control units and a peripheral device controller, wherein said peripheral device controller is in electrical communication with a data processing unit by way of a common communication bus, and wherein said plural magnetic tape device control units and said data processing unit each may have unique data formats, data densities, data processor code conventions, logic level conventions and data transfer rates, said logic timing system which comprises:

(a) clock frequency source means for providing a primary clock signal;

(b) logic input means in electrical communication with, and responsive to first logic control signals received from, said plural magnetic tape device control units, said tape device adapter and said peripheral device controller, wherein said first logic control signals indicate data sources, data destinations and data operations to be performed by said tape device adapter, for providing second logic control signals to initialize said logic timing system and select one of plural operation modes to conform the operation of said logic timing system with that of said plural magnetic tape device control units and said peripheral device controller in supporting said data operations;

(c) logic synchronization means in electrical communication with said logic input means and said clock frequency source means, and responsive to said primary clock signal and to first ones of said second logic control signals for providing a timing control signal synchronized with said primary clock signal to control the transfer of binary information from said plural magnetic tape device control units and said peripheral device controller through said tape device adapter;

(d) logic data tracking means in electrical communication with said logic input means, said logic synchronization means, said clock frequency source means, said peripheral device controller, and said tape device adapter, and receiving said timing control signal, and responsive to said primary clock signal, to a second one of said second logic control signals indicating one of plural data operations and to third logic control signals received from said tape device adapter which indicate the progress, direction of flow, and data operation being performed upon binary information being transferred through said tape device adapter for selectively issuing data transfer requests to said plural magnetic tape device control units and to said peripheral device controller, thereby avoiding data overruns and underruns during a transfer of binary information through said tape device adapter; and (e) phase control logic means in electrical communication with said logic data tracking means, said clock frequency source means, and said tape device adapter, and responsive to said primary clock signal and to those of said third logic control signals indicating the direction of flow of binary information in said tape device adapter and the data operation being performed by said tape device adapter for selectably varying the phase of said primary clock signal for application to said tape device adapter to control the transfer rate of binary information through said tape device adapter.

2. A logic timing system for controlling the flow rate of binary information streams through a tape device adapter which provides logic paths for the exchange of binary information between a peripheral device controller in electrical communication with a common communication bus of a data processing system, and plural magnetic tape device control units accommodating varying data formats, data densities, data processor code conventions and logic level conventions, wherein said tape device adapter includes both data packing logic means for accommodating varying data formats and densities, and adapter command register means responsive to control signals received from said peripheral device controller for identifying the data operation to be performed by said tape device adapter and selecting logic flow paths for binary information streams transferred through said tape device adapter, said logic timing system which comprises:

(a) logic input means in electrical communication with said plural magnetic tape device control units, said tape device adapter, and said peripheral device controller, and responsive to first logic control signals received from said plural magnetic tape device control units and said peripheral device controller for detecting the occurrence of a data transfer request, issuing a first timing control signal to cause said logic timing system to enter into a clear operation mode precedent to an information transfer, and issuing second logic control signals;

(b) clock frequency source means for providing a primary clock signal;

(c) logic synchronization means in electrical communication with said clock frequency source means and said logic input means, and responsive to said primary clock signal and to a first one of said second logic control signals indicating a pending information transfer for providing a second timing control signal synchronized with said primary clock signal to control the transfer of binary information through said tape device adapter;

(d) first clock frequency generation logic means in electrical communication with said clock frequency source means and responsive to said primary clock signal and to first logic data tracking signals for providing a first clock signal having a first frequency to said tape device adapter;

(e) second clock frequency generation logic means in electrical communication with said first clock frequency generation logic means, and responsive to said first clock signal for applying a phase shift to said first clock signal to provide a second clock signal;

(f) phase control logic means in electrical communication with said first clock frequency generation logic means, said second clock frequency generation logic means and said adapter command register means, and responsive to third logic control signals received from said adapter command register means which indicate the direction of flow of binary information in said tape device adapter and the data operation being performed by said tape device adpater for issuing fourth logic control signals, and third timing control signals to select one of said first clock signal and said second clock signal for application to said data packing logic means; and (g) data tracking logic means in electrical communication with said phase control logic means, said logic input means, said logic synchronization means, said clock frequency source means, said first clock frequency generation logic means, said peripheral device controller, said adapter command register means and said data packing logic means, and responsive to said primary clock signal, to said third logic control signals, to a logic control signal received from said data packing logic means which indicates the progress of binary information being transferred through said tape device adapter, to a second one of said second logic control signals indicating one of plural data operations and to said fourth logic control signals for supplying said first logic data tracking signals to said first clock frequency generation logic means, and fifth logic control signals to said phase control logic means to cause said logic timing system to enter selectably into wait, normal and burst operation modes to synchronize the operation of said logic timing system with that of said plural magnetic tape device control units and said peripheral device controller.

3. The logic timing system set forth in claim 2, which further comprises a third clock frequency generation logic means in electrical communication with said clock frequency source means for providing a third clock signal having a frequency different from that of said primary clock signal.

4. The logic timing system set forth in claim 1, which further comprises a clock frequency generation logic means in electrical communication with said clock frequency source means for providing a clock signal having a frequency different from that of said primary clock signal.

5. The logic timing system set forth in claim 4, wherein said plural operation modes selected by said logic input means include clear, wait, normal and burst modes.

* * * * *